United States Patent
Korobkin et al.

(10) Patent No.: US 11,860,281 B2
(45) Date of Patent: Jan. 2, 2024

(54) METHODS AND SYSTEMS FOR FILTERING DATA POINTS WHEN MERGING LIDAR SENSOR DATASETS

(71) Applicant: YANDEX SELF DRIVING GROUP LLC, Moscow (RU)

(72) Inventors: Mikhail Vladimirovich Korobkin, Lipetsk (RU); Dmitry Andreevich Kovalenko, Butovo (RU); Andrey Anatolevich Minin, Vidnoye (RU)

(73) Assignee: DIRECT CURSUS TECHNOLOGY L.L.C, Dubai (AE)

( * ) Notice: Subject to any disclaimer, the term of this patent is extended or adjusted under 35 U.S.C. 154(b) by 312 days.

(21) Appl. No.: 17/136,532

(22) Filed: Dec. 29, 2020

(65) Prior Publication Data
US 2021/0221398 A1 Jul. 22, 2021

(30) Foreign Application Priority Data
Jan. 20, 2020 (RU) ................................ 2020102069

(51) Int. Cl.
*G01S 7/487* (2006.01)
*G01S 17/931* (2020.01)
(Continued)

(52) U.S. Cl.
CPC ......... *G01S 17/931* (2020.01); *B60W 60/001* (2020.02); *G06F 18/2415* (2023.01);
(Continued)

(58) Field of Classification Search
CPC ...... B60W 60/01; G06V 10/803; G06V 20/56
See application file for complete search history.

(56) References Cited

U.S. PATENT DOCUMENTS

| 10,222,211 B2 | 3/2019 | Chen et al. |
| 10,304,237 B2 | 5/2019 | Sequeira et al. |
| (Continued) | | |

FOREIGN PATENT DOCUMENTS

| CA | 3051795 A1 | 8/2018 |
| DE | 102017212376 A1 | 1/2019 |
| (Continued) | | |

OTHER PUBLICATIONS

S. Rusinkiewicz and M. Levoy, "Efficient variants of the ICP algorithm," Stanford University. Published in Proceedings Third International Conference on 3-D Digital Imaging and Modeling, Quebec City, Quebec, Canada, 2001, pp. 145-152. http://www.pcl-users.org/file/n4037867/Rusinkiewicz_Effcient_Variants_of_ICP.pdf.

(Continued)

*Primary Examiner* — Jess Whittington
(74) *Attorney, Agent, or Firm* — BCF LLP

(57) ABSTRACT

Method and device for processing LIDAR sensor data are disclosed. The method includes (i) receiving from the LIDAR sensor a first dataset having a plurality of first data points representative of respective coordinates and associated with respective normal vectors, (ii) determining an uncertainty parameter for a given first data point based on a normal covariance of the normal vector of the given first data point where the normal covariance takes into account a measurement error of the LIDAR sensor when determining the respective coordinates of the given first data point, (iii) in response to the uncertainty parameter being above a pre-determined threshold, excluding the given first data point from the plurality of first data points, (iv) using the filtered plurality of first data points, instead of the plurality of first data points, for merging the first dataset of the LIDAR sensor with a second dataset of the LIDAR sensor.

18 Claims, 7 Drawing Sheets

(51) Int. Cl.
  *B60W 60/00* (2020.01)
  *G06V 20/56* (2022.01)
  *G06F 18/25* (2023.01)
  *G06F 18/2415* (2023.01)
  *G06V 10/80* (2022.01)

(52) U.S. Cl.
  CPC ............ *G06F 18/25* (2023.01); *G06V 10/803* (2022.01); *G06V 20/56* (2022.01); *B60W 2420/52* (2013.01); *B60W 2422/00* (2013.01)

(56) References Cited

U.S. PATENT DOCUMENTS

| | | |
|---|---|---|
| 2018/0313956 A1 | 11/2018 | Rzeszutek et al. |
| 2019/0072965 A1 | 3/2019 | Zhang et al. |
| 2019/0266779 A1 | 8/2019 | Kulkarni et al. |
| 2019/0323844 A1 | 10/2019 | Yendluri et al. |
| 2020/0043186 A1* | 2/2020 | Selviah ................ G06T 7/33 |
| 2020/0211293 A1 | 7/2020 | Kim et al. |
| 2020/0284590 A1* | 9/2020 | Chen ................ G01C 21/3841 |
| 2021/0319236 A1 | 10/2021 | Tang et al. |
| 2022/0126873 A1 | 4/2022 | Alghanem et al. |
| 2022/0129684 A1 | 4/2022 | Saranin et al. |

FOREIGN PATENT DOCUMENTS

| | | |
|---|---|---|
| GB | 2507560 A8 | 5/2014 |
| RU | 2656711 C2 | 6/2018 |
| RU | 2691679 C1 | 6/2019 |
| WO | 2018195999 A1 | 11/2018 |

OTHER PUBLICATIONS

Schneider et al.,"RegNet: Multimodal sensor registration using deep neural networks", Published on Jul. 11, 2017, IEEE Intelligent Vehicles Symposium (IV), pp. 1803-1810.

Russian Search report dated Nov. 12, 2021 in respect of the counterpart Russian Patent Application RU 2020102069.

Office Action dated Apr. 19, 2023 in respect of the related U.S. Appl. No. 17/136,691.

* cited by examiner

METHODS AND SYSTEMS FOR FILTERING DATA POINTS WHEN MERGING LIDAR SENSOR DATASETS

FIELD OF TECHNOLOGY

The present technology relates to computer-implemented data processing and, more specifically, to methods and systems for processing LIDAR sensor data.

BACKGROUND

Several computer based navigation systems that are configured for aiding navigation and/or control of vehicle have been proposed and implemented in the prior art. These systems range from more basic map-aided localization based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control system, which systems upon detection of the vehicle (or other obstacle) in front of the moving vehicle, slow down or stop the vehicle.

Some of the more advanced system provide for a fully autonomous driving of the vehicle without direct control from the operator (i.e. the driver). These autonomously vehicles include computer systems that can cause the vehicle to accelerate, brake, stop, change lane and self-park.

One of the main technical challenges in implementing the above computer systems is the ability for the computer system to detect an object present around the SDC—such as a vehicle in front of the SDC (the SDC having the computer system onboard), which vehicle in front may pose a risk/danger to the SDC and may require the computer system to take a corrective measure, be it braking or otherwise changing speed, stopping or changing lanes. On a more granular level, the challenge of the object detection is not just the binary detection (presence or absence of the object), but the speed and accuracy associated with such an analysis and determination (especially avoiding "false negatives", whereby the system does not identify an object which is indeed present in front or around the vehicle).

A typical autonomous vehicle or a self-driving car (SDC), for short, comprises a plurality of sensors to enable the SDC to capture and "understand" its surround area. Typically, more than one type of sensors is used. For example, a given implementation of the SDC can include one or more cameras, one or more LIDARs, and one or more radars.

Thus, the SDC may receive data, in a form of 3D point clouds, of a given scene of its surrounding area from multiple LIDARs, where each 3D point cloud generated, by a respective one of the LIDARs, independently represents a respective portion of the given scene. Each 3D point cloud typically comprises scattered LIDAR points. Further, the SDC may combine the 3D point clouds generated by the multiple LIDARs in order to generate a comprehensive representation of the given scene, for example, for purposes of detecting objects or generating a 3D map. However, the 3D point clouds corresponding to the respective portions of the given scene may not be suitable for further generating the comprehensive representation of the given scene. For example, these 3D point clouds may not be aligned with each other geometrically, i.e. they can be represented as tilted relative to each other, for example. Furthermore, at least two 3D point clouds may include LIDAR points representative of one and the same objects (or parts thereof); therefore, such 3D point clouds should be merged to avoid causing unnecessary or redundant information in the comprehensive representation of the given scene, which may ultimately affect overall accuracy of detecting objects in the surrounding area of the SDC.

For merging the 3D data representative of overlapping objects in different portions of the given scene, an Iterative Closest Point (ICP) algorithm may be used. The ICP algorithm typically comprises executing the following steps: (1) identifying a first 3D point cloud (also referred to herein as a reference 3D point cloud, or a target 3D point cloud) and a second 3D point cloud (also referred to herein as a source 3D point cloud); (2) for each LIDAR point in the first 3D point cloud, selecting a corresponding LIDAR point in the second 3D point cloud; (3) minimizing a distance between the LIDAR points by applying a transformation (at least one of translation or rotation, for example); (4) iteratively repeating steps (2) and (3) until a predetermined condition is reached. The predetermined condition may be, for example, a predetermined threshold value of an error metric. By so doing, the ICP algorithm is configured to merge the first 3D point cloud with the second 3D point cloud.

There are several prior art approaches to executing the ICP algorithm. For example, selecting corresponding LIDAR points may be performed based on a distance between LIDAR points in the first 3D point cloud and the respective LIDAR points in the second 3D point cloud. To that end, the ICP algorithm may be configured to iteratively select closest corresponding LIDAR points and minimize the distance therebetween up to a predetermined threshold value of an error metric. In this example, the error metric may be a sum of squared distances between corresponding points in the 3D point clouds, a so-called point-to-point metric (accordingly, the ICP algorithm is referred to as a point-to-point variant of the ICP algorithm).

SUMMARY

It is an object of the present technology to ameliorate at least some of the inconveniences present in the prior art. It has been observed that, in certain applications, the prior art methods of selecting corresponding points may not yield a desirable accuracy level of convergence of the ICP algorithm. In other words, their ability to minimize the error metric may be limited, which can result in objects, in the comprehensive representation of the given scene, being distorted, for example.

Developers of the present technology have devised a modified ICP framework to be implemented by an electronic device for merging 3D point clouds provided by LIDAR systems. Broadly speaking, the modified ICP framework defined by the developers of the present technology may be implemented by the electronic device as one or more computer-implemented procedures which together result in an executed of a modified ICP algorithm by the electronic device. This modified ICP framework includes some or all of: (i) an initialization step, (ii) a filtration step, (iii) a matching step, (iv) a transformation estimation step, and (v) a termination criteria achievement step.

During the initialization step of the modified ICP framework, an electronic device may be configured to begin execution a modified ICP algorithm by "initializing" transformation between a pair of captured 3D point clouds. In other words, during the initialization step, the electronic device may be configured to, in a sense, make an "initial guess" of a transformation rule for merging the pair of captured 3D point clouds. In some cases, during the initialization step, the electronic device may be configured to map both captured 3D point clouds in a common 3D space.

During the filtration step of the modified ICP framework, the electronic device may be configured to (i) analyze each one of the pair of captured 3D point clouds and (ii) filter out at least some data points from each of the pair of captured 3D point clouds. It should be noted that filtration of data points of a given registered 3D point cloud may be beneficial for practical purposes, as the data rate of modern LIDAR systems may hinder the computational performance of the electronic device.

It should be noted that a typical LIDAR system may capture, during a single scan, between 30000 to 150000 data points. By performing the filtration step, however, the electronic device may be configured to filter out a large number of these data points so as to determine a "filtered" 3D point cloud that is to be used during a next step of the modified ICP framework. For example, a given filtered 3D point cloud may include between 5% and 15% of data points from the respective captured 3D point cloud.

It should be noted that, the electronic device may be configured to determine a respective "normal vector" or simply "normal" for respective data points of the captured 3D point cloud. However, some of these normal may be miscalculated (for several reasons, including for example uncertainty in geometric positioning information of at least some of the data points of the captured 3D point cloud). As a result, the filtered 3D point cloud includes fewer data points than the respective registered 3D point cloud since at least some data points in the respective captured 3D point cloud may have high-uncertainty normals that need to be filtered out. It is beneficial to filter out such data points since miscalculated normals may negatively affect the accuracy of the transformation estimation step.

The developers of the present technology have devised methods and devices for improving the filtration step. In at least some embodiments of the present technology, the electronic device may be configured to perform the filtration step on the basis of normal estimation and normal covariance of data points in a captured 3D point cloud.

Typically, a normal for a given data point of the captured 3D point cloud may be estimated by the electronic device via a Singular Value Decomposition (SVD) method while using a number of neighbouring data points in proximity of the given data point. However, in some cases, some of these neighbouring data points may be sampled from a different surface than the corresponding surface of the given data point for which the normal is being computed. For example, these cases may occur when the given data point is located near a boundary of the corresponding surface. In such cases, employing the SVD method while using neighbouring data points from an other surface may result in the electronic device computing a normal vector for the given data point that does not describe the actual corresponding surface on which the given data point is located.

However, developers of the present technology have realized that such estimation of normals via SVD methods does not take into account measurement errors of the LIDAR system when capturing data points of the captured 3D point cloud. In other words, developers of the present technology have realized that coordinates of data points in the captured 3D point cloud are not exact, or otherwise biased, and are subject to a measurement error during capturing thereof by the LIDAR system.

Hence, in at least some embodiments of the present technology, the developers of the present technology have devised methods and devices where a Normal Covariance Filter (NCF) is employed during the filtration step and which allows the electronic device to take into account the uncertainty in coordinates of data points in the captured 3D point clouds. The electronic device employing the NCF treats the uncertainty in coordinates of data points in the captured 3D point clouds as Gaussian random variables. It should be noted that the measurement error of the LIDAR system may be approximated by a sphere with a standard deviation.

It should be noted that the filtration step of the modified ICP framework may be performed by the electronic device on each one of the pair of captured 3D point clouds. As a result, the electronic device may thereby be configured to determine (i) a first filtered 3D point cloud from a first captured 3D point cloud, and (ii) a second filtered 3D point cloud from a second captured 3D point cloud.

During the matching step of the modified ICP framework, the electronic device may be configured to determine pairs of data points, where a given pair of data points includes (i) a first data point from the first filtered 3D point cloud, and (ii) a second data point from the second filtered 3D point cloud that corresponds to the respective first data point. For example, the matching step may be performed by the electronic device employing a kD tree by selecting a closest point in the second filtered 3D point cloud to the first data point from the first filtered 3D point cloud.

Developers of the present technology have realized that by limiting which matched pairs of data points are to be used during the merging process may be computationally beneficial for the electronic device. As such, the developers of the present technology have devised methods and devices for improving the matching step by performing an "outlier rejection sub-step".

Broadly speaking, during the outlier rejection sub-step, the electronic device may be configured to identify a set of "outliers", or in other words, a set of initially-matched pairs of data points in which the respective data points are highly unlikely to correspond to each other. It should be noted that the developers of the present technology have devised means for identifying such outliers. For example, developers of the present technology have identified a "geometric criterion" that may be instrumental for identifying such outliers.

It should be noted that this geometric criterion depends on the geometry of the LIDAR system itself. For example, some LIDAR systems may be implemented as spinning LIDAR systems having a plurality of vertically adjacent radiation sources. The plurality of vertically adjacent radiation sources correspond to respective levels of the spinning LIDAR system and which sometimes are referred to as "rings" of the spinning LIDAR system. It is contemplated that in at least some embodiments of the present technology, the geometric criterion may be derived from geometric characteristics of the spinning LIDAR system—that is, the geometric criterion may be derived from (i) an angular increment of the LIDAR azimuthal rotation, and (ii) angular distances in pitch between respective rings thereof.

In the context of the present specification, this geometric criterion may be referred to as "the geometric correspondence rejector". This geometric criterion may be met when a distance between (i) the first data point from the first filtered 3D point cloud and (ii) the second data point from the second filtered 3D point cloud is below a geometry-based threshold. This geometry-based threshold may be referred in the present specification as a "largest neighbour beam distance". Put another way, if the point-to-point actual distance (such as for example a Euclidean distance) between the second data point and the first data point in the initially-matched pair is longer than the "largest neighbour beam distance" of the first data point, this initially-matched pair is rejected from further processing. Again, it should be noted that "largest neighbour beam distance" for the first data point may be determined by the electronic device and depends on the geometry of the LIDAR system used to capture the first data point.

During the transformation estimation step of the modified ICP framework, the electronic device is configured to estimate the transformation rule for merging the first 3D point cloud with the second 3D point cloud. For example, the electronic device may be configured to estimate the transformation rule by performing a uniformly weighted linearized least squares optimization with a point-to-plane metric. It should be noted that other weighting schemes may be employed by the electronic device for matched pairs of data points. It should also be noted that although point-to-plane metric is generally more beneficial than a point-to-point metric, the point-to-point metric may also be used, without departing from the scope of the present technology.

During the termination criteria achievement step of the modified ICP framework, the electronic device may perform a number of iterations (e.g., iterations of the ICP algorithm) until one or more termination thresholds are achieved. For example, the one or more termination thresholds may include a threshold on (i) an absolute magnitude of the transformation, (ii) a relative magnitude of the transformation, and (iii) a total number of iterations.

In a first broad aspect of the present technology, there is provided a computer-implemented method of processing LIDAR sensor data. The method is executable by an electronic device operatively coupled to a LIDAR sensor. The method comprises receiving, by the electronic device from the LIDAR sensor, a first dataset having a plurality of first data points. A given first data point from the plurality of first data points is (i) representative of respective coordinates in a 3D space and (ii) associated with a respective normal vector from a plurality of normal vectors. The method comprises determining, by the electronic device, an uncertainty parameter for the given first data point based on a normal covariance of the normal vector of the given first data point. The normal covariance takes into account a measurement error of the LIDAR sensor when determining the respective coordinates of the given first data point. The measurement error of the LIDAR sensor affects calculation of the normal vector. The method comprises, in response to the uncertainty parameter being above a pre-determined threshold, excluding, by the electronic device, the given first data point from the plurality of first data points, thereby determining a filtered plurality of first data points. The method comprises using, by the electronic device, the filtered plurality of first data points, instead of the plurality of first data points, for merging the first dataset of the LIDAR sensor with a second dataset of the LIDAR sensor.

In some embodiments of the method, the method further comprises receiving, by the electronic device from the LIDAR sensor, the second dataset having a plurality of second data points. A given second data point from the plurality of second data points is (i) representative of respective coordinates in a 3D space and (ii) associated with a respective normal vector from an other plurality of normal vectors. The method further comprises determining, by the electronic device, an other uncertainty parameter for the given second data point based on a normal covariance of the normal vector of the given second data point. The normal covariance takes into account the measurement error of the LIDAR sensor when determining the respective coordinates of the given second data point. The measurement error of the LIDAR sensor affects calculation of the normal vector of the given second data point. The method further comprises, in response to the uncertainty parameter being above a pre-determined threshold, excluding, by the electronic device, the given second data point from the plurality of second data points, thereby determining a filtered plurality of second data points. The method further comprises using, by the electronic device, the filtered plurality of second data points, instead of the plurality of second data points, for merging the first dataset of the LIDAR sensor with the second dataset of the LIDAR sensor.

In some embodiments of the method, the method further comprises determining, by the electronic device, the normal covariance of the normal vector of the given first data point while taking into account an uncertainty in the respective coordinates of the given first data point.

In some embodiments of the method, the uncertainty is approximated as a Gaussian random variable.

In some embodiments of the method, the measurement error of the LIDAR sensor is approximated by a sphere with a standard deviation.

In some embodiments of the method, the using the filtered plurality of first data points comprises using, by the electronic device, the filtered plurality of first data points instead of the plurality of first data points during a matching step of an ICP algorithm.

In some embodiments of the method, the using the filtered plurality of first data points comprises estimating, by the electronic device, a transformation rule between the first dataset and the second dataset.

In some embodiments of the method, the transformation rule is an output of the ICP algorithm.

In some embodiments of the method, the LIDAR sensor is mounted onto a Self-Driving Car (SDC).

In some embodiments of the method, the method further comprises using, by the electronic device, merged first and second datasets for controlling operation of the SDC.

In a second broad aspect of the present technology, there is provided an electronic device for processing LIDAR sensor data. The electronic device is operatively coupled to a LIDAR sensor. The electronic device is configured to receive, from the LIDAR sensor, a first dataset having a plurality of first data points. A given first data point from the plurality of first data points is (i) representative of respective coordinates in a 3D space and (ii) associated with a respective normal vector from a plurality of normal vectors. The electronic device is configured to determine, by the electronic device, an uncertainty parameter for the given first data point based on a normal covariance of the normal vector of the given first data point. The normal covariance takes into account a measurement error of the LIDAR sensor when determining the respective coordinates of the given first data point. The measurement error of the LIDAR sensor affects calculation of the normal vector. The electronic device is configured to, in response to the uncertainty parameter being above a pre-determined threshold, exclude the given first data point from the plurality of first data points, thereby determining a filtered plurality of first data points. The electronic device is configured to use the filtered plurality of first data points, instead of the plurality of first data points, for merging the first dataset of the LIDAR sensor with a second dataset of the LIDAR sensor.

In some embodiments of the electronic device, the electronic device is further configured to receive, from the LIDAR sensor, the second dataset having a plurality of second data points. A given second data point from the plurality of second data points is (i) representative of respective coordinates in a 3D space and (ii) associated with a respective normal vector from an other plurality of normal vectors. the electronic device is further configured to determine, by the electronic device, an other uncertainty parameter for the given second data point based on a normal covariance of the normal vector of the given second data point. The normal covariance takes into account the measurement error of the LIDAR sensor when determining the respective coordinates of the given second data point. The measurement error of the LIDAR sensor affects calculation of the normal vector of the given second data point. The electronic device is further configured to, in response to the other uncertainty parameter being above a pre-determined threshold, exclude the given second data point from the plurality of second data points, thereby determining a filtered plurality of second data points. the electronic device is further configured to use the filtered plurality of second data points, instead of the plurality of second data points, for merging the first dataset of the LIDAR sensor with the second dataset of the LIDAR sensor.

In some embodiments of the electronic device, the electronic device is further configured to: determine the normal covariance of the normal vector of the given first data point while taking into account an uncertainty in the respective coordinates of the given first data point.

In some embodiments of the electronic device, the uncertainty is approximated as a Gaussian random variable.

In some embodiments of the electronic device, the measurement error of the LIDAR sensor is approximated by a sphere with a standard deviation.

In some embodiments of the electronic device, to use the filtered plurality of first data points comprises the electronic device configured to use the filtered plurality of first data points instead of the plurality of first data points during a matching step of an ICP algorithm.

In some embodiments of the electronic device, to use the filtered plurality of first data points comprises the electronic device configured to estimate a transformation rule between the first dataset and the second dataset.

In some embodiments of the electronic device, the transformation rule is an output of the ICP algorithm.

In some embodiments of the electronic device, the LIDAR sensor is mounted onto a Self-Driving Car (SDC).

In some embodiments of the electronic device, the electronic device is further configured to use merged first and second datasets for controlling operation of the SDC.

In a third broad aspect of the present technology, there is provided a computer-implemented method of processing LIDAR sensor data. The method is executable by an electronic device operatively coupled to a LIDAR sensor. The LIDAR sensor includes a plurality of vertically spaced lasers. The LIDAR sensor is rotatable about a vertically extending axis. The method comprises receiving, by the electronic device from the LIDAR sensor, an indication of the LIDAR sensor data including a first dataset having a plurality of first data points, and a second dataset having a plurality of second data points. Each one from the plurality of first data points and each one from the plurality of second data points is representative of respective coordinates in a 3D space and associated with a respective normal vector from a plurality of normal vectors. The method comprises matching, by the electronic device, at least some of the plurality of first data points with at least some of the plurality of second data points, thereby determining a plurality of pairs. A given one of the plurality of pairs includes (i) a given first data point and (ii) a given second data point. The given first data point and the given second data points are separated by a point-to-point actual distance. The method comprises, for the given one of the plurality of pairs, determining, by the electronic device, a pair-specific filtering parameter by: (i) defining for the given first data point, a set of neighbouring points, where the set of neighbouring points is associated with a subset of lasers of the plurality of lasers vertically adjacent to a given laser that has been instrumental in generating the given first point, and where the subset of lasers has been instrumental in generating the set of neighbouring points; (ii) calculating neighbour beam distances between the given first data point and respective ones the set of neighbouring points, where given neighbour beam distance is representative of a linear distance between the given first data point and a respective one of the set of neighbouring points; and (iii) in response to the point-to-point actual distance being above a largest neighbour beam distance, determining the pair-specific filtering parameter to be positive. The method comprises, in response to the pair-specific parameter being positive, excluding the given one of the plurality of pairs from further processing, thereby defining a reduced plurality of pairs. The method comprises processing, by the electronic device, the reduced plurality of pairs for merging the first dataset and the second dataset.

In some embodiments of the method, the first dataset and the second dataset have been captured during sequential scanning phases of the LIDAR sensor.

In some embodiments of the method, the set of neighbouring points generated comprises four neighbouring points.

In some embodiments of the method, the four neighbouring points comprise two points vertically above the given first data point and two points vertically below the given first data point.

In some embodiments of the method, the calculating the neighbour beam distances comprises: (i) determining, by the electronic device, a given diagonal vector between the given first data point and a respective one of the set of neighbouring points in a first coordinate system; and (ii) calculating, by the electronic device, the respective neighbour beam distance by projecting the given diagonal vector onto a reflecting surface orthogonal to a laser path direction.

In some embodiments of the method, the calculating the neighbour beam distances is based on a following equation:

$$d_{k,l} = \frac{\|p_{k,l}\|^2}{\sqrt{\|p_{k,l}\|^2 - \|\langle p_{k,l}, n_k \rangle\|^2}}$$

wherein $d_{k,l}$ is the given neighbour beam distance between the given first data point $p_k$ and a respective neighbouring point $p_l$, wherein $p_{k,l}$ is the given diagonal vector between the given first data point $p_k$ and a respective neighbouring point $p_l$, and wherein $n_k$ is a normal vector of the given first data point $p_k$.

In some embodiments of the method, the given first data point and the set of neighbouring points define a segment of a unit sphere.

In some embodiments of the method, the method further comprises approximating spatial coordinates of the given first data point on the unit sphere by an approximation plane.

In some embodiments of the method, the approximation plane is based on an assumption that laser beams generated by the plurality of lasers are parallel.

In some embodiments of the method, the calculating the neighbour beam distances is based on an angular increment of azimuthal rotation and angular distances in pitch between vertically spaced lasers.

In some embodiments of the method, the processing the reduced plurality of pairs comprises estimating, by the electronic device, a transformation rule between the first dataset and the second dataset.

In some embodiments of the method, the transformation rule is output of an ICP-type algorithm performed by the electronic device.

In some embodiments of the method, the LIDAR sensor is mounted onto a Self-Driving Car (SDC).

In some embodiments of the method, the method further comprises using the merged first dataset and second datasets for controlling operation of the SDC.

In a fourth broad aspect of the present technology, there is provided a computer-implemented method of processing LIDAR sensor data. The method is executable by an electronic device operatively coupled to a LIDAR sensor. The LIDAR sensor includes a plurality of vertically spaced lasers. the LIDAR sensor is rotatable about a vertically extending axis. The method comprises receiving, by the electronic device from the LIDAR sensor, an indication of the LIDAR sensor data including a first dataset having a plurality of first data points, and a second dataset having a plurality of second data points. Each one from the plurality of first data points and each one from the plurality of second data points is representative of respective coordinates in a 3D space and associated with a respective normal vector from a plurality of normal vectors. The method comprises matching, by the electronic device, at least some of the plurality of first data points with at least some of the plurality of second data points, thereby determining a plurality of pairs. A given one of the plurality of pairs includes (i) a given first data point and (ii) a given second data point. The given first data point and the given second data points are separated by a point-to-point actual distance. The method comprises, for the given one of the plurality of pairs, determining a largest neighbour beam distance amongst a plurality of neighbour beam distances by: (i) calculating neighbour beam distances between the given first data point and respective ones a set of neighbouring points, where the set of neighbouring points are associated with a subset of lasers of the plurality of lasers vertically adjacent to a given laser that has been instrumental in generating the given first point, and where the subset of lasers has been instrumental in generating the set of neighbouring points, and where a given neighbour beam distance is representative of a linear distance between the given first data point and a respective one of the set of neighbouring points; and (ii) identifying, by the electronic device, the largest neighbour beam distance amongst the plurality of neighbour beam distances. The method comprises, in response to the largest neighbour beam distance being above the point-to-point actual distance, excluding the given one of the plurality of pairs from further processing, thereby defining a reduced plurality of pairs. The method comprises processing, by the electronic device, the reduced plurality of pairs for merging the first dataset and the second dataset.

In a fifth broad aspect of the present technology, there is provided an electronic device for processing LIDAR sensor data. The electronic device is operatively coupled to a LIDAR sensor. The LIDAR sensor includes a plurality of vertically spaced lasers. The LIDAR sensor is rotatable about a vertically extending axis. The electronic device is configured to receive, from the LIDAR sensor, an indication of the LIDAR sensor data including a first dataset having a plurality of first data points, and a second dataset having a plurality of second data points. Each one from the plurality of first data points and each one from the plurality of second data points is representative of respective coordinates in a 3D space and associated with a respective normal vector from a plurality of normal vectors. The electronic device is configured to match at least some of the plurality of first data points with at least some of the plurality of second data points, thereby determining a plurality of pairs. A given one of the plurality of pairs includes (i) a given first data point and (ii) a given second data point, the given first data point and the given second data points separated by a point-to-point actual distance. The electronic device is configured to, for the given one of the plurality of pairs, determine a pair-specific filtering parameter by: (i) defining for the given first data point, a set of neighbouring points, where the set of neighbouring points is associated with a subset of lasers of the plurality of lasers vertically adjacent to a given laser that has been instrumental in generating the given first point, the subset of lasers has been instrumental in generating the set of neighbouring points; (ii) calculating neighbour beam distances between the given first data point and respective ones the set of neighbouring points, where a given neighbour beam distance is representative of a linear distance between the given first data point and a respective one of the set of neighbouring points; (iii) in response to the point-to-point actual distance being above a largest neighbour beam distance, determining the pair-specific filtering parameter to be positive. The electronic device is configured to, in response to the pair-specific parameter being positive, exclude the given one of the plurality of pairs from further processing, thereby defining a reduced plurality of pairs. The electronic device is configured to process the reduced plurality of pairs for merging the first dataset and the second dataset.

In some embodiments of the electronic device, the first dataset and the second dataset have been captured during sequential scanning phases of the LIDAR sensor.

In some embodiments of the electronic device, the set of neighbouring points generated comprises four neighbouring points.

In some embodiments of the electronic device, the four neighbouring points comprise two points vertically above the given first data point and two points vertically below the given first data point.

In some embodiments of the electronic device, the electronic device configured to calculate the neighbour beam distances comprises the electronic device configured to: (i) determine a given diagonal vector between the given first data point and a respective one of the set of neighbouring points in a first coordinate system; and (ii) calculate the respective neighbour beam distance by projecting the given diagonal vector onto a reflecting surface orthogonal to a laser path direction.

In some embodiments of the electronic device, the electronic device configured to calculate the neighbour beam distances is configured to employ a following equation:

$$d_{k,l} = \frac{\|p_{k,l}\|^2}{\sqrt{\|p_{k,l}\|^2 - \|\langle p_{k,l}, n_k \rangle\|^2}}$$

wherein $d_{k,l}$ is the given neighbour beam distance between the given first data point $p_k$ and a respective neighbouring point $p_l$, wherein $p_{k,l}$ is the given diagonal vector between the given first data point $p_k$ and a respective neighbouring point $p_l$, and wherein $n_k$ is a normal vector of the given first data point $p_k$.

In some embodiments of the electronic device, the given first data point and the set of neighbouring points define a segment of a unit sphere.

In some embodiments of the electronic device, the electronic device is further configured to approximate spatial coordinates of the given first data point on the unit sphere by an approximation plane.

In some embodiments of the electronic device, the approximation plane is based on an assumption that laser beams generated by the plurality of lasers are parallel.

In some embodiments of the electronic device, the electronic device is configured to calculate the neighbour beam distances based on an angular increment of azimuthal rotation and angular distances in pitch between vertically spaced lasers.

In some embodiments of the electronic device, the electronic device configured to process the reduced plurality of pairs comprises the electronic device configured to estimate a transformation rule between the first dataset and the second dataset.

In some embodiments of the electronic device, the transformation rule is output of an ICP-type algorithm performed by the electronic device.

In some embodiments of the electronic device, the LIDAR sensor is mounted onto a Self-Driving Car (SDC).

In some embodiments of the electronic device, the electronic device 210 is further configured to use the merged first dataset and second datasets for controlling operation of the SDC.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

Figure 1:
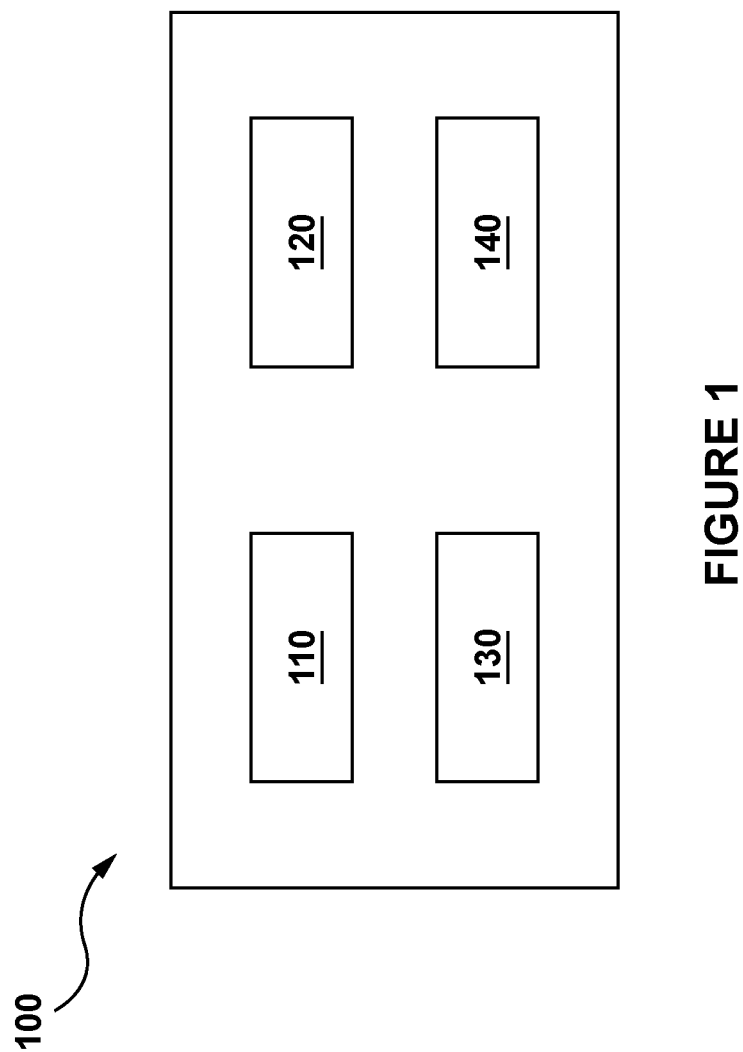
FIG. 1 depicts a schematic diagram of an example computer system for implementing certain embodiments of systems and/or methods of the present technology.

Furthermore, APPENDIX A has been enclosed following the Detailed Description. The APPENDIX A comprises an article providing information regarding at least some aspects of the present technology described herein and/or additional aspects of the present technology. The APPENDIX A and the information forming part thereof have been enclosed for reference purposes and are to be deleted from the application prior to the publication of the application as a patent.

Furthermore, APPENDIX B has been enclosed following the Detailed Description. The APPENDIX B comprises a poster providing information regarding at least some aspects of the present technology described herein and/or additional aspects of the present technology. The APPENDIX B and the information forming part thereof have been enclosed for reference purposes and are to be deleted from the application prior to the publication of the application as a patent.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components, such as a network communication module 140 for communication, via a communication network (for example, a communication network 245 depicted in FIG. 2) with other electronic devices and/or servers, localization modules (not depicted), and the like.

Figure 2:
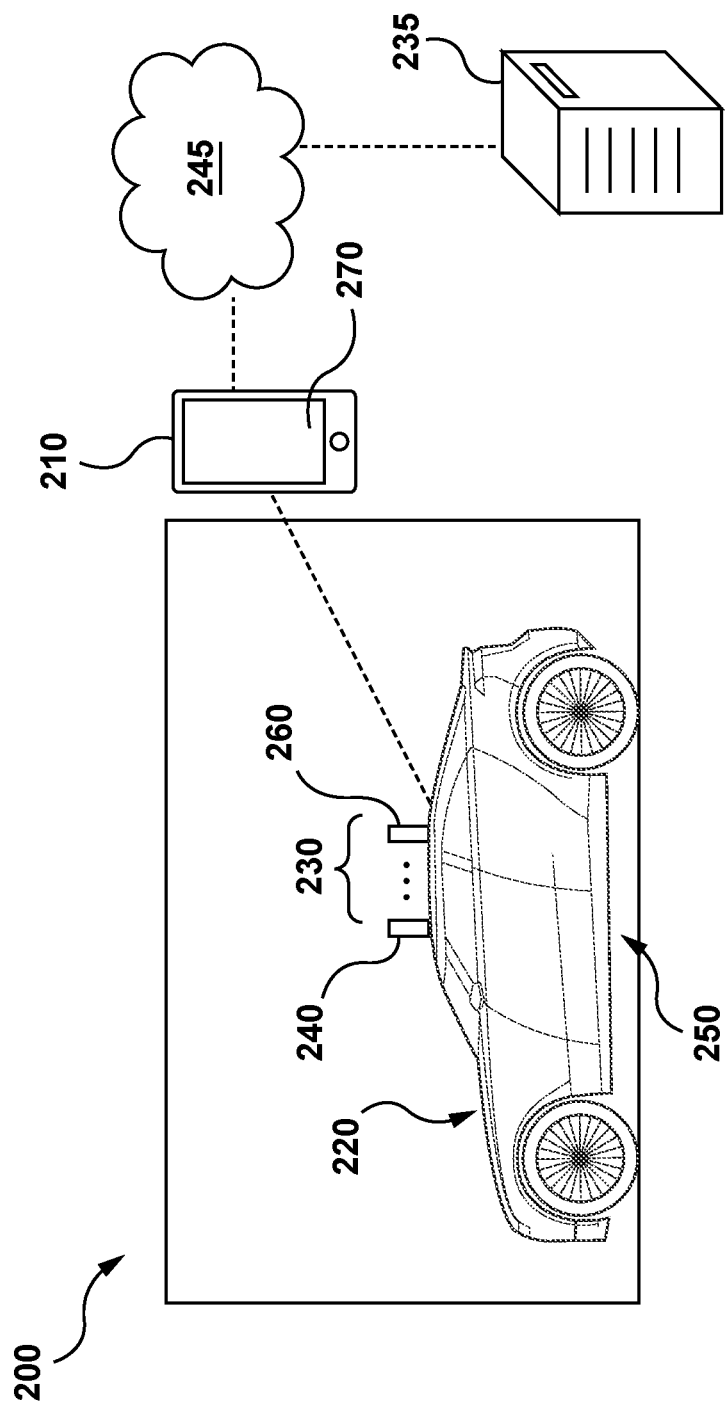
FIG. 2 depicts a networked computing environment being suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, or associated with a user (not depicted) who can operate the vehicle 220, a server 235 in communication with the electronic device 210 via a communication network 245 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220 to which the electronic device 210 is associated may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™ vehicle navigation device, Garmin™ vehicle navigation device), a tablet, a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, the solid-state drive 120 and the memory 130. In other words, the electronic device 210 comprises hardware and/or software and/or firmware, or a combination thereof, for determining the presence of an object around the vehicle 220, as will be described in greater detail below.

In accordance with the non-limiting embodiments of the present technology, the electronic device 210 further comprises or has access to a plurality of sensors 230. According to these embodiments, the plurality of sensors 230 may comprise sensors allowing for various implementations of the present technology. Examples of the plurality of sensors include but are not limited to: cameras, LIDAR systems, and RADAR systems, etc. Each of the plurality of sensors 230 is operatively coupled to the processor 110 for transmitting the so-captured information to the processor 110 for processing thereof, as will be described in greater detail herein below.

Each or some of the plurality of sensors 230 can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, each or some of the plurality of sensors 230 can be mounted in a dedicated enclosure (not depicted) mounted on the top of the vehicle 220.

Further, the spatial placement of each or some of the plurality of sensors 230 can be designed taking into account the specific technical configuration thereof, configuration of the enclosure, weather conditions of the area where the vehicle 220 is to be used (such as frequent rain, snow, and other elements) or the like.

In some non-limiting embodiments of the present technology, the plurality of sensors comprises at least a first sensor 240 and a second sensor 260. In these embodiments, both the first sensor 240 and the second sensor 260 can be configured to capture a 3D point cloud data of the surrounding area 250 of the vehicle 220. In this regard, each of the first sensor 240 and the second sensor 260 may comprise a LIDAR instrument.

LIDAR stands for LIght Detection and Ranging. It is expected that a person skilled in the art will understand the functionality of the LIDAR instrument, but briefly speaking, a transmitter (not depicted) of one of the first sensor 240 and the second sensor 260 implemented as the LIDAR sends out a laser pulse and the light particles (photons) are scattered back to a receiver (not depicted) of one of the first sensor 240 and the second sensor 260 implemented as the LIDAR instrument. The photons that come back to the receiver are collected with a telescope and counted as a function of time. Using the speed of light (~3×10$^8$ m/s), the processor 110 can then calculate how far the photons have traveled (in the round trip). Photons can be scattered back off of many different entities surrounding the vehicle 220, such as other particles (aerosols or molecules) in the atmosphere, other cars, stationary objects or potential obstructions in front of the vehicle 220.

In a specific non-limiting example, each one of the first sensor 240 and the second sensor 260 can be implemented as the LIDAR-based systems that may be of the type available from Velodyne LiDAR, Inc. of 5521 Hellyer Avenue, San Jose, CA 95138, the United States of America. It should be expressly understood that the first sensor 240 and the second sensor 260 can be implemented in any other suitable equipment.

However, in the non-limiting embodiments of the present technology, the first sensor 240 and the second sensor 260 do not have to be implemented based on the same LIDAR-based sensor, as such, respective technical characteristics of the first sensor 240 may differ from those of the second sensor 260.

In some embodiments of the present technology, the first sensor 240 and the second sensor 260 can be housed in the above-mentioned enclosure (not separately depicted) located on the roof of the vehicle 220. Further, in the non-limiting embodiments of the present technology, the plurality of sensors 230 may comprise more than LIDAR-based sensors, such as three or any other suitable number. In these embodiments, all LIDAR-based sensors, along with the first sensor 240 and the second sensor 260, can be housed in the above-mentioned enclosure (not separately depicted).

In the non-limiting embodiments of the present technology, the first sensor 240 and the second sensor 260 are calibrated such that for a first 3D point cloud captured by the first sensor 240 and a second 3D point cloud captured by the second sensor 260, the processor 110 is configured to identify overlapping regions by merging the first 3D point cloud and the second 3D point cloud. This calibration can be executed during the manufacturing and/or set up of the vehicle 220. Or at any suitable time thereafter or, in other words, the calibration can be executed during retrofitting the vehicle 220 with the first sensor 240 and the second sensor 260 in accordance with the non-limiting embodiments of the present technology contemplated herein. Alternatively, the calibration can be executed during equipping the vehicle 220 with the first sensor 240 and the second sensor 260 in accordance with the non-limiting embodiments of the present technology contemplated herein.

In some non-limiting embodiments of the present technology, each of the first sensor 240 and the second sensor 260 may be respective rotational LIDAR systems, or sometimes referred to as "spinning LIDAR systems", each operating with its pre-determined scanning frequency. Accordingly, in these non-limiting embodiments, the processor 110 may be configured to synchronize, for example, the first sensor 240 with the second sensor 260 by adjusting the associated scanning frequencies such that, at a given moment in time, the first sensor 240 and the second sensor 260 are at a same angular position relative to their respective vertical central axes. By so doing, the processor 110 is configured to cause the first sensor 240 and the second sensor 260 to capture 3D data indicative of one and the same scene of the surrounding area 250 of the vehicle 220.

In some non-limiting embodiments of the present technology, the synchronization of the first sensor 240 and the second sensor 260 may be initialized, by the processor 110, inter alia, during maintenance periods of the vehicle 220; at moments of starting the vehicle 220; or during the operation of the vehicle 220 with a certain periodicity.

It is also contemplated that the plurality of sensors 230 may further comprise other sensors (not depicted), such as cameras, radars, Inertial Measurement Unit (IMU) sensors, and the like.

In some non-limiting embodiments of the present technology, the communication network 245 is the Internet. In alternative non-limiting embodiments, the communication network 245 can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 245 is implemented will depend, inter alia, on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 245 may also use a wireless connection with the server 235.

In some embodiments of the present technology, the server 235 is implemented as a conventional computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 235 is a single server. In alternative non-limiting embodiments of the present technology (not depicted), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

In the description provided herein, when certain processes and method steps are executed by the processor 110 of the electronic device 210, it should be expressly understood that such processes and method steps can be executed solely by the processor 110, in a shared manner (i.e. distributed) between the processor 110 and the server 235, or solely by the server 235. In other words, when the present description refers to the processor 110 or the electronic device 210 executing certain processes or method steps, it is to expressly cover processes or steps executed by the processor 110, by the server 235, or jointly executed by the processor 110 and the server 235.

Figure 3:
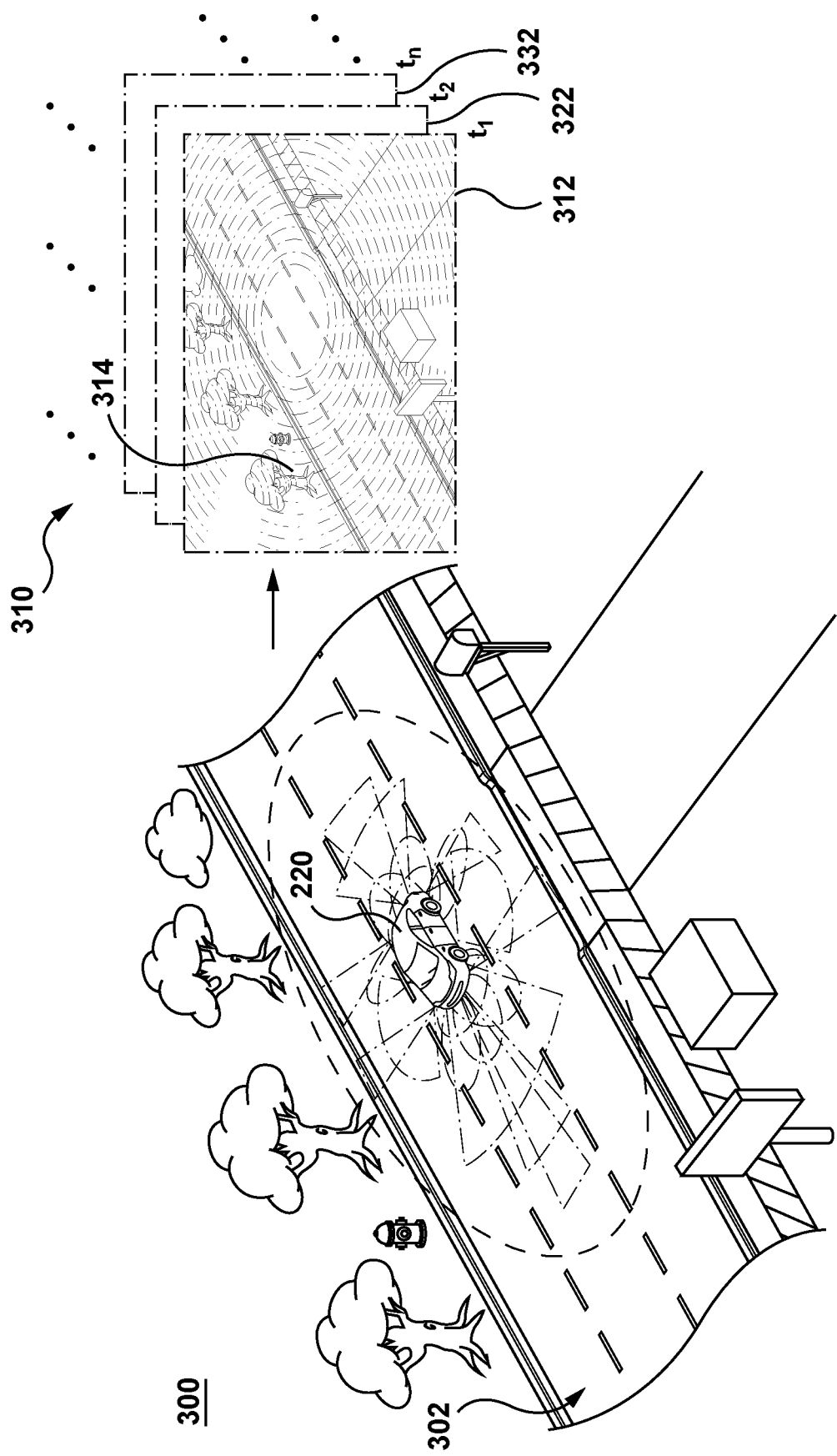
FIG. 3 depicts a LIDAR data acquisition procedure executed by a processor of an electronic device of the networked computing environment of FIG. 2, and more specifically, the procedure for receiving the 3D point cloud data captured by one of sensors of a vehicle present in the networked computing environment of FIG. 2.

With reference to FIG. 3, there is depicted a process 300 (also referred to as a LIDAR data acquisition procedure 300), executed by the electronic device 210 for generating LIDAR data 310 captured by a rotational LIDAR system of the vehicle 220 (e.g., the first sensor 240). In some non-limiting embodiments of the present technology, the process 300 can be executed in a continuous manner. In other embodiments of the present technology, the process 300 can be implemented at pre-determined intervals, such as every 2 milliseconds or any other suitable time interval.

It should be noted that as the vehicle 220 is travelling on a road 302, the electronic device 210 is configured to acquire LIDAR data 310 from the rotational LIDAR system and which is representative of objects in the surrounding area 250 of the vehicle 220.

Broadly speaking, the LIDAR data 310 is acquired by the electronic device 210 in a form of a plurality of captured 3D point clouds (not numbered) including: a first captured 3D point cloud 312, a second captured 3D point cloud 332, an $n^{th}$ captured 3D point cloud 332, and so forth. It should be noted that a given captured 3D point cloud comprises a large number of data points registered by the rotational LIDAR system during a respective scan of the surrounding area 250.

To better illustrate this, let's take the example of the first captured 3D point cloud 312 acquired by the electronic device 210 at a moment in time $t_1$. The first captured 3D point cloud 312 comprises a large number of data points captured by the rotational LIDAR system during a first scan thereby of the surrounding area 250. For example, the first captured 3D point cloud 312 may include 30 000 captured data points, 50 000 captured data points, 150 000 captured data points, or the like, which are representative of objects in the surrounding area 250.

One of the captured data points of the first captured 3D point cloud 312 is a captured data point 314. Data indicative of the captured data point 314 may include spatial coordinates of the captured data point 314 in 3D space as determined/captured by the rotational LIDAR system. It is contemplated that additional data may be associated with the captured data point 314. For instance, one or more additional parameters such as, for example, distance, intensity, and/or angle, as well as other parameters, may be associated with the captured data point 314, as known in the art.

It is contemplated that the rotational LIDAR system may captured a respective captured 3D point cloud at a respective time step while the vehicle 220 is travelling. Such time step may in some cases correspond to an interval of time that is necessary for the rotational LIDAR system to perform a scan of the surrounding area 250. Such time step may also correspond to an interval of time that is necessary for the rotational LIDAR system to perform a full rotation about an azimuthal axis thereof.

For example, once the rotational LIDAR system performs the first scan of the surroundings, the rotational LIDAR system may provide to the electronic device 210, at the moment $t_1$, the first captured 3D point cloud 312. In the same example, once the rotational LIDAR system performs the second scan of the surroundings, the rotational LIDAR system may provide to the electronic device 210, at the moment $t_2$, the captured 3D point cloud 322. In the same example, once the rotational LIDAR system performs the $n^{th}$ scan of the surroundings, the rotational LIDAR system may provide to the electronic device 210, at the moment $t_n$, the $n^{th}$ captured 3D point cloud 332.

Overall, it can be said that, as the vehicle 220 is travelling on the road 302, the electronic device 210 may be configured to acquire from the rotational LIDAR system of the vehicle 220 the LIDAR data 310. The LIDAR data 310 may comprise inter alia the plurality of 3D point clouds that has been captured by the rotational LIDAR system during respective scans of the surrounding area 250.

In some embodiments of the present technology, the electronic device 210 may be configured to merge the plurality of captured 3D point clouds. For example, by merging the plurality of registered 3D point clouds, the electronic device 210 may be configured to generate a 3D map representation of the surrounding area 250 of the vehicle 220. Such 3D map representation of the surrounding area 250 may be employed by the electronic device 210 for controlling operation of the vehicle 220 when travelling on the road 302.

To that end, the electronic device 210 may be configured to perform one or more 3D point cloud merging techniques. In at least some embodiments of the present technology, the electronic device 210 may be configured to merge a given pair of captured 3D point clouds from the LIDAR data 310 by executing an Iterative Closest Point (ICP) algorithm.

Broadly speaking, the ICP algorithm is configured to minimize the distance between a pair of 3D point clouds. Usually, during execution of the ICP algorithm, one 3D point cloud is referred to as a "target" or "reference" 3D point cloud, while the other 3D point cloud is referred to as a "source" 3D point cloud. The goal of the ICP algorithm is to keep the target 3D point cloud fixed and to identify a "transformation rule" that, when applied onto the source 3D point cloud, would result in the pair of 3D point clouds being merged with each other.

Typically, the ICP algorithm includes the following steps executed iteratively:
 initializing the merging process by performing an "initial guess" of how the pair of registered 3D clouds are to be located in a same 3D space
 selecting and/or filtering the registered 3D points clouds, for determining which data points are to be used for a next step of the ICP algorithm;
 matching the selected/filtered data points, thereby determining correspondences between data points from the target 3D point cloud and data points form the source 3D point cloud;
 assigning an error metric; and
 minimizing the error metric by applying one of transformation rules.

It is contemplated that in some cases, the electronic device 210 may be configured to perform weighting of some matched pairs of data points and/or reject other matched pairs of data points, prior to minimizing the error metric.

It should be noted that the electronic device 210 may be configured to estimate one or more the transformation rules that may be used for evaluating an error metric at a respective iteration of the ICP algorithm. Hence, it can be said that, by iteratively applying estimated transformation rules to minimize the error metric between the corresponding pairs of data points from the pair of 3D point clouds, the electronic device 210 causes the source 3D point cloud to go through a plurality of "intermediate positions" to a "final position" at which the selected and matched data point pairs are substantially merged.

Some examples of known methods of performing the ICP algorithm are described in the article entitled "Efficient Variants of the ICP Algorithm," written by Szymon Rusinkiewicz and Marc Levoy, and published by Stanford University; the content of which is hereby incorporated by reference in its entirety.

It should be noted that (i) selecting/filtering data points and (ii) matching corresponding data points have an important effect on the efficiency of the ICP algorithm performed by the electronic device 210 for merging the pair of 3D point clouds.

Modified Selection Step

In a first broad aspect of the present technology, the developers of the present technology have devised methods and devices for improving the selection/filtration step of data points during the ICP algorithm. Put another way, in at least some embodiments of the present technology, the electronic device 210 is configured to perform a modified ICP algorithm during which a particular type of data point filtration is used for ameliorating the efficiency of the merging procedure between a pair of 3D point clouds.

First of all, data point filtration may allow the electronic device 210 to perform the merging of 3D point clouds faster. It should be noted that conventional LIDAR systems may provide a given captured 3D point cloud having a large number of captured data points, as mentioned above (e.g., between 30 000 and 150 000 registered data points). As such, taking into account each and every one of these captured data points during execution of the ICP algorithm can hinder the computation performance of the electronic device 210.

Second of all, it should be noted that the electronic device 210 may be configured to estimate and use normal vectors, or simply "normals", associated with respective captured data points for performing one or more steps of the ICP algorithm. However, normals for at least some captured data points may be miscalculated (erroneously estimated) for a variety of reasons. For example, a given normal may be miscalculated due to an improper selection of neighbouring captured data points—that is, a given normal for a given captured data point may be estimated based on neighbouring captured data points that are not located on the same surface as the given captured data point. Such miscalculation typically occurs when the given captured data point is located near a boundary of a surface on which it is located. As a result, captured data points having erroneously estimated normals ought to be filtered out from following steps of the ICP algorithm since such erroneously estimated normals may negatively affect the accuracy of the transformation estimation step of the ICP algorithm.

However, developers of the present technology have realized that, in addition to an improper selection of neighbouring captured data points during estimation of a given normal of a given registered data point, other reasons may cause the electronic device 210 to erroneously estimate the given normal of the given captured data point. For example, the developers of the present technology have realized that the electronic device 210 may erroneously estimate the given normal of the given captured data point due to an erroneous capturing of the given captured data point by the LIDAR system. More specifically, the developers of the present technology have realized that the electronic device 210 may erroneously estimate the given normal of the given captured data point due to an erroneous measurement of the spatial coordinates of the given captured data point by the LIDAR system.

Put another way, the developers of the present technology have realized that spatial coordinates of a given captured data point are subject to a "measurement error" attributed to the LIDAR system itself during capturing. Hence, if the given captured data point is associated with erroneous spatial coordinates, the electronic device 210 is likely to erroneously estimate the normal for that given captured data point.

As a result, the developers of the present technology have devised a particular type of computer-implemented data point filter to be used during the filtration step of the ICP algorithm and which accounts for the uncertainty in spatial coordinates of captured data points by treating this uncertainty as Gaussian random variables. In the context of the present specification, this computer-implemented data point filter will be referred to as a "Normal Covariance Filter" (NCF).

Developers of the present technology have realized that employing the NCF during the filtration step of the ICP algorithm allows (i) reduce a number of captured data points in some or each 3D point cloud that are to be merged, which allows accelerating execution of the ICP algorithm, and (ii) filtering out captured data points with erroneously registered spatial coordinates causing respective miscalculated normals, which allows reducing negative effects on the precision of the transformation estimation step of the ICP algorithm.

How the electronic device 210 is configured to implement the NCF and how the electronic device 210 is configured to filter a given captured 3D point cloud via the NCF will now be described in greater details.

Filtering a Registered 3D Point Cloud by Using the NCF

Figure 4:
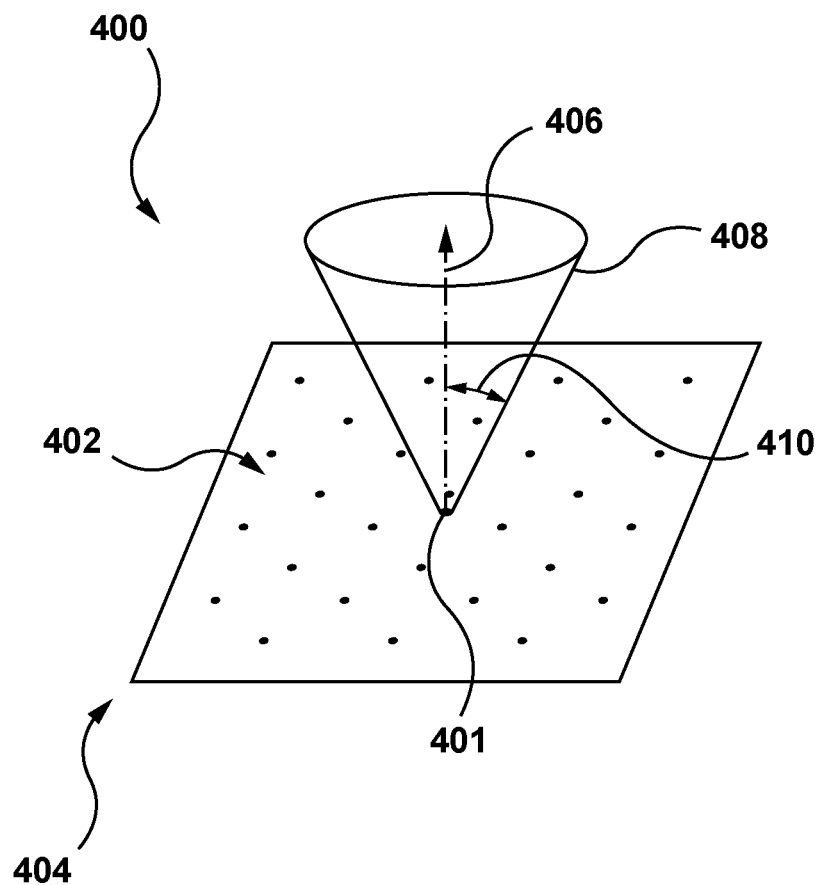
FIG. 4 depicts a filtration process for a given captured data point of a given captured 3D point cloud of the LIDAR system of FIG. 2, in accordance with at least some embodiments of the present technology.

How the electronic device 210 is configured to filter a given captured 3D point cloud for determining a respective filtered 3D point cloud will now be discussed in greater detail with reference to a single given captured data point from the given captured 3D point cloud. With reference to FIG. 4, there is depicted a filtration process 400 for a given captured data point 401 of a given captured 3D point cloud. However, it should be noted that the electronic device 210 may be configured to perform the filtration process 400 described herein below for respective captured data points from the given captured 3D point cloud for determining whether or not it is to be included in the respective filtered 3D point cloud.

As depicted in FIG. 4, the electronic device 210 may be configured to identify a set of captured data points 402 that are sampled from the given captured 3D point cloud such that they are in proximity to the given captured data point 401.

In some embodiments of the present technology, the electronic device 210 may use data indicative of the set of captured data points 402 during execution an SVD algorithm of the modified filtration step of the ICP algorithm. Broadly speaking, the electronic device 210 may be configured to input into the SVD algorithm data representative of the set of captured data points 402. For example, it is contemplated that the electronic device 210 may be configured to input into the SVD algorithm a matrix D where:

$$D \in R^{\{k \times 3\}} \quad (1)$$

where k is a number of captured data points in the set of captured data points 402. As such, the matrix D inputted into the SVD algorithm represents the spatial coordinates of a k number of captured data points in the set of captured data points 402. For greater clarity, it should be noted that a notation such as $D_{i,j}$ will refer to an entry i,j from the matrix D, and a notation $D_i$ will refer to a column i of the matrix D when counting from zero.

By inputting the matrix D into the SVD algorithm, the electronic device 210 may receive, in response thereto, an output from the SVD algorithm such as:

$$D = USV \text{ where } U \in R^{\{k \times 3\}}, S \in R^{\{3 \times 3\}}, V \in R^{\{3 \times 3\}} \quad (2)$$

where U, S, and V are matrix components of the SVD algorithm, and where the matrices U and V are orthogonal matrices representing a collection of basis vectors, and where S represents, in a sense, "influence" of data points in the space represented by $V_i$ vectors from the matrix V. Additional details regarding matrices U, S, and V are provided in the APPENDICES A and B.

It should be noted that in cases where entries of matrix D are random variables, $V_2$ may also include random variables. Developers of the present technology contemplate that the entries of the matrix D may be Gaussian random variables. Further, it should be noted that $V_2$ from the matrix V corresponds to a normal vector 406 of an estimated plane 404, as illustrated in FIG. 4. Also, $V_0$ and $V_1$ from the matrix V represent arbitrary vectors constrained to form a left-handed coordinate system $V_0$, $V_1$, and $V_2$. Also, the developers of the present technology contemplate that $S_2$ represents a measure of non-planarity of the estimated plane 404.

It is contemplated that the electronic device 210 may be configured to estimate the covariance of the normal vector $V_2$ (e.g., plane normal) by propagation of the uncertainty technique. Broadly speaking, propagation of uncertainty (or propagation of error) refers to the effect of uncertainty of variables on the uncertainty of a function that is based thereon. When the variables are the values of experimental measurements, for example as in this case the spatial coordinates of captured data points, they have uncertainties due to measurement limitations (e.g., instrument-related measurement error of the LIDAR system) which propagate due to the combination of variables in the respective function.

Thus, it can be said that the electronic device 210 may be configured to estimate the covariance of the normal vector $V_2$ (the normal vector 406) by propagation of the uncertainty technique via the following:

$$\text{Cov}[V_2] = J^T \text{Cov}[D] J \text{ where } J = \frac{\partial f(D)}{\partial D}(D) \qquad (3)$$

where Cov[D] is the covariance of the matrix D and is computed as follows:

$$\text{Cov}[D] = \xi \cdot I^{\{3 \times 3\}} \qquad (4)$$

and where the function $f$ in the Equation (3) is a sequence of computations that the electronic device 210 may be configured to perform in order to yield $V_2$ from the matrix D, where I is an identity matrix, and where the measurement error of the LIDAR system is approximated by a sphere with a standard deviation $\xi$.

It should be noted that the measurement error of the LIDAR system being approximated via a sphere with a standard deviation means that spatial coordinates of a given captured data point may be located within a respective sphere with a standard deviation $\xi$. It is contemplated that the value of may be obtained from a manufacturer of the LIDAR system.

It should be noted however that covariance of $V_2$ (i.e., Cov[$V_2$]), lies in the system of coordinates of the LIDAR system. Therefore, the electronic device 210 may be configured to perform an alignment step so that Cov[$V_2$] is in alignment with $V_2$, such that:

$$\text{Cov}[V_2] = QCQ^{-1} \text{ or } C = Q^{-1} \text{Cov}[V_2] Q \qquad (5)$$

where matrix C is a covariance of $V_2$ in a normal-aligned coordinate system (e.g., coordinate system defined by $V_0$, $V_1$, and $V_2$), and where Q and $Q^{-1}$ are matrices used for performing the alignment, or in other words, matrices indicative of a transformation between an original coordinate system (e.g., the coordinate system of the LIDAR system) and the normal-aligned coordinate system.

The electronic device 210 may be configured to use a given element of the matrix C for performing a decision-making process on whether the given captured data point 401 is to be filtered out/excluded from the filtered 3D point cloud. More specifically, the electronic device may be configured to compare element $C_{2,2}$ from the matrix C to determine whether the given captured data point 401 is to be filtered out. To that end, the electronic device 210 may be configured to compare $C_{2,2}$ against a threshold value $c_T$:

$$C_{2,2} \geq C_T \qquad (6)$$

where $c_T$ is a pre-determined threshold, and where $C_{2,2}$ is the element of the matrix C.

It should be noted that $C_{2,2}$ represents a distribution of potential normal vectors, for the given captured data point 401, projected on an axis aligned with $V_2$. It should be noted that a cone 408 illustrated in FIG. 4 includes a plurality of potential normal vectors that can be determined based on inter alia the set of captured data points 402 and where the spatial coordinates of the set of captured data points 402 respectively fall within spheres with the standard deviation (e.g., while taking into account the measurement error of the LIDAR system). As such, this means that $C_{2,2}$ may be a value representing an extent to which potential normal vectors may deviate from the normal $V_2$ in the cone 408. It can also be said that $C_{2,2}$ is related to on an angle 410 of the cone 408. It should be noted that the threshold value $c_T$ may be pre-determined by an operator of the electronic device 210. For example, the threshold value $c_T$ may be obtained via data-driven optimization techniques.

Hence, it is contemplated that if the value $C_{2,2}$ for the given captured data point 401 is above the threshold value $c_T$, the electronic device 210 may be configured to exclude the given captured data point 401 from further processing since the given captured data point 401 is associated with a normal uncertainty value that is too high (e.g., above the threshold value $c_T$).

As previously alluded to, the electronic device 210 may be configured to compute the matrix C for each captured data point from the given captured 3D point cloud, similarly to how the electronic device 210 computes the matrix C for the given captured data point 401. Hence, the electronic device 210 may be configured to compute the value $C_{2,2}$ for each captured data point from the given captured 3D point cloud and may compare it to the threshold value $c_T$, similarly to how the electronic device 210 is configured to compute the value $C_{2,2}$ for the given captured data point 401 and compare it to the threshold value $c_T$.

Therefore, the electronic device 210 may be configured to filter out, from the given captured 3D point cloud, a set of excluded captured data points with the highest normal uncertainty values by comparing respective values of $C_{2,2}$ against the threshold value $c_T$, while taking into account the uncertainty of respective spatial coordinates caused by the measurement error of the LIDAR system.

As a result, by applying the above filtration process 400 on respective captured data points, the electronic device 210 is configured to obtain a first filtered 3D point cloud, from the first captured 3D point cloud, which includes data points with precise normal vectors. The electronic device 210 may then be configured to employ the first filtered 3D point cloud, instead of the first captured 3D point cloud, during subsequent steps of the ICP algorithm. It should be noted that at least some aspects of the present technology related to the filtration process 400 are discussed in greater detail in APPENDICES A and B of the present specification. It is contemplated that the electronic device 210 may be configured to determine a second filtered 3D point cloud based on the second captured 3D point cloud in a similar manner to how the electronic device 210 is configured to determine first filtered 3D point cloud based on the first registered 3D point cloud.

Modified Matching Step

In a second broad aspect of the present technology, the developers of the present technology have devised methods and devices for improving the matching step of the ICP algorithm. Put another way, in at least some embodiments of the present technology, the electronic device 210 is configured to perform a modified ICP algorithm during which geometric information regarding the LIDAR system, which captured the two 3D point clouds being merged, is used for rejecting at least some pairs of data points. So-rejecting at least some pairs of data points may allow the electronic device 210 to ameliorate the efficiency of the merging procedure between the two 3D point clouds.

It should be noted that in some embodiments, the electronic device 210 may be configured to execute this modified matching step of the ICP algorithm onto the first filtered 3D point cloud and the second filtered 3D point cloud, as described above, instead of the first captured 3D point cloud and the second captured 3D point cloud. However, in alternative non-limiting embodiments of the present technology, only one of the modified steps (i.e. either modified filtering step or modified matching step) may be executed.

Optionally, it is contemplated that the electronic device 210 may be configured to perform this modified matching step of the ICP algorithm onto filtered 3D point clouds that have been filtered by the electronic device 210 during a selection step of the ICP algorithm in a different manner to what is described above—that is, the electronic device 210 may be configured to execute this modified matching step onto 3D point clouds having been determined in any suitable manner for a given application.

Broadly speaking, the purpose of the modified matching step being executed by the electronic device 210 is to (i) determine pairs of matched pairs of data points (also referred to as "correspondences"), and (ii) to "reject" some of these pairs so as to ameliorate the efficiency of the merging procedure.

Therefore, it can be said that the electronic device 210 may be configured to employ the first filtered 3D point cloud and the second filtered 3D point cloud for matching data points into respective pairs, such that each pair includes (i) given first data point from the first filtered 3D point cloud and (ii) a given second data point from the second filtered 3D point cloud. By so doing, the electronic device 210 may be configured to determine correspondences between the two filtered 3D point clouds.

The electronic device 210 may determine initial correspondences between data points in a variety of ways. In one example, the electronic device 210 may be configured to determine the initial pairs of data point based on a shortest distance therebetween. In another example, the electronic device 210 may be configured to determine pairs of data points, not only based on the shortest distance therebetween, but also based on an analysis of respective normal vectors.

Nevertheless, irrespective of how the electronic device 210 is configured to determine the initial pairs of data points between the first filtered 3D point cloud and the second filtered 3D point cloud (e.g., the initial correspondences), the electronic device 210 may be configured to employ the geometric correspondence rejector (GCR) for "rejecting" at least some initial pairs of data points, thereby determining a reduced plurality of pairs of data points to be used during a next step of the ICP algorithm.

As mentioned above, the GCR may be met when a distance between data points of a given initial pair of data points is below a geometry-based threshold. The geometry-based threshold may be referred herein as a neighbour beam distance. As it will become apparent from the description herein further below, in at least some embodiments of the present technology, the geometry-based threshold may be a longest neighbour beam distance amongst a set of neighbour beam distances determined for a given data point. How the electronic device 210 may be configured to determine this geometry-based threshold will now be described.

It is contemplated that the electronic device 210 may be configured to determine a plurality of initial pairs (initial correspondences) between the two 3D point clouds, and then, may be configured to use at least one neighbour beam distance for respective initial pairs to determine a reduced plurality of pairs between the two 3D point clouds. For example, the electronic device 210 may be configured to determine:

$$M=\{\forall \tilde{m}_k \in \tilde{M}:\text{IsInlier}(p_k,p'_k;\tilde{m}_k)\} \quad (7)$$

where M is the reduced plurality of pairs, $\tilde{M}$ is the plurality of initial pairs (prior to rejection of at least some initial pairs), $\tilde{m}_k$ being a given initial pair from the plurality of initial pairs, $p_k$ being a given first data point from the first 3D point cloud and being in the given initial pair $\tilde{m}_k$, and $p'_k$ being a given second data point from second 3D point cloud and being in the given initial pair $\tilde{m}_k$.

It should be noted that the IsInlier may be a computer-implemented procedure performed by the electronic device 210 and makes use of the geometry-based threshold for determining whether or not a given initial pair is to be considered as an "inlier", and therefore should be included in the reduced plurality of pairs, or whether the given initial pair is to be considered as an "outlier", and therefore should be excluded from the reduced plurality of pairs. Hence, it can be said that the IsInlier is, in a sense, a computer-implemented "test" that the electronic device 210 may employ for determining the reduced plurality of pairs. It should be noted that the IsInlier test is described in greater detail in the APPENDICES A and B.

To better illustrate the IsInlier test, it should be noted that a given one of the plurality of initial pairs is characterized by:

$$\|\tilde{m}_k\|=\|p_k-p'_k\| \quad (8)$$

where $\|\tilde{m}_k\|$ is the Euclidean distance between the data points in the given initial pair. It is contemplated that a point-to-point distance between the data points in the given initial pair may correspond to the Euclidean distance between these data points.

As such, it can be said that the IsInlier test follows the following logic:

$$\|\tilde{m}_k\| < \max_{l \in \{0...3\}} d(p_k,p_l) \quad (9)$$

where the a given $d(p_k,p_l)$, or shortly $d_{k,l}$, is a given neighbour beam distance for the first given data point $p_k$ from the given initial pair $\tilde{m}_k$. Put another way, the Equation (9) means that the purpose of the IsInlier test performed by the electronic device 210 is to compare (i) the Euclidean distance between the initial pair of data points against an upper bound of a number neighbour beam distances for the first data point $p_k$. In other words, the purpose of the IsInlier test performed by the electronic device 210 is to compare (i) the point-to-point distance between the initial pair of data points against a longest one of a number neighbour beam distances for the first data point $p_k$.

Figure 5:
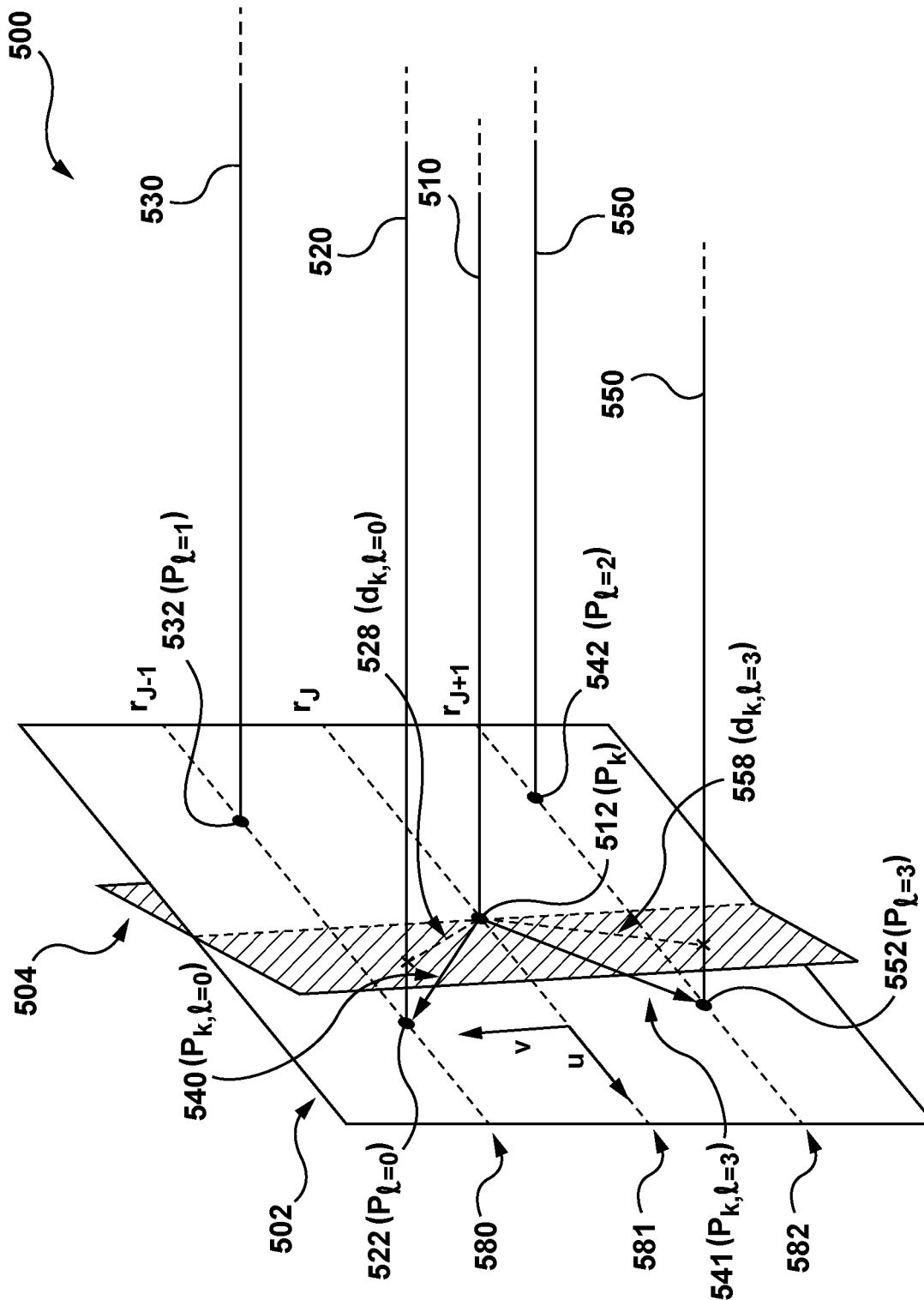
FIG. 5 depicts a visual representation of a neighbour beam distance as determined by the electronic device of FIG. 1, in accordance with at least some embodiments of the present technology.

To better illustrate this, reference will now be made to FIG. 5 depicted a procedure 500 for determining the geometry-based threshold (e.g., the longest one of the number of neighbour beam distances) for a given first data point from a given initial pair. As seen in the FIG. 5, let it be assumed that a first data point 512 corresponds to the first data point $p_k$. Also let it be assumed, as described above, that during the modified matching step, the electronic device 210 has paired the first data point 512 with a given second data point $p'_k$ from an other 3D point cloud, and that the Euclidean distance (point-to-point distance) between this initial pair of data points $p_k$ and $p'_k$ is as defined by the Equation (8).

As such, the electronic device 210 may be configured to determine a geometry-based threshold for the first data point 512 for executing the IsInlier test onto the initial pair of data points $p_k$ and $p'_k$. To that end, the electronic device 210 may be configured to identify neighbouring data points (also referred herein as "neighbour data points or "neighbours") from the first 3D point cloud to the first data point 512.

As depicted in FIG. 5, these neighbour data points are first data points 522, 532, 542, and 552. Thus, it can be said that the first given data point 512 ($p_k$) may have four neighbours denoted as $p_l$, where $l \in \{0 \ldots 3\}$. In other words, the neighbour data points include the first data point 522 ($p_{l=0}$), the first data point 532 ($p_{l=1}$), the first data point 542 ($p_{l=2}$), and the first data point 552 ($p_{l=3}$).

It should be noted that these neighbour data point 522, 532, 542, and 552 are produced by lasers of the rotational LIDAR system that are vertically adjacent to the laser having produced the first given data point 512 ($p_k$). For example, the neighbour data points 522 and 532 are registered via a first given laser that produces beams 520 and 530, the first data point 512 ($p_k$) is registered via a second given laser that produces beam 510, and the neighbour data points 542 and 552 are registered via a third given laser that produces beams 550.

Conventionally, it should be noted that for rotational LIDAR systems, a level of each laser of the rotational LIDAR system is called a "ring", so if $p_k$ is part of the ring $r_j$, the neighbour data points $p_l$ where $l \in \{0 \ldots 3\}$ are on adjacent rings $r_{j-1}$ and $r_{j+1}$. Put another way, the first given laser corresponds to a ring 580, the second given laser corresponds to a ring 581, and the third given laser corresponds to a ring 582.

Also, it should be noted that (i) "left" neighbour data points 522 ($p_{l=0}$) and 552 ($p_{l=3}$) are captured at a previous increment of LIDAR azimuthal rotation, (ii) the first data point 512 ($p_k$) is captured at a current increment of LIDAR azimuthal rotation, and (iii) "right" neighbour data points 532 ($p_{l=1}$) and 542 ($p_{1=2}$) are captured at a next increment of LIDAR azimuthal rotation.

It should be noted that the electronic device 210 may be configured to acquire angular distances between the first data point 512 ($p_k$) and each one of the neighbour data points 522, 532, 542, and 552. For example, for a calibrated rotational LIDAR system, the electronic device 210 may be configured to acquire calibration parameters such as: $\phi$ being an angular increment of the LIDAR system azimuthal rotation, and $\theta_{j-1}$ and $\theta_{j+1}$ being angular distances in pitch between the rings (from ring 581 to ring 580 and from ring 581 to ring 582, respectively).

It can be said that the first data point 512 ($p_k$) and the neighbours 522, 532, 542, and 552 ($p_l$ where $l \in \{0 \ldots 3\}$) may be represented on a segment of the unit-sphere. Put another way, the first data point 512 ($p_k$) and the neighbouring data points 522, 532, 542, and 552 define a segment of the unit-sphere. This segment could be approximated by a plane 502 in FIG. 5, in turn assuming neighbor beams parallel It should be noted that such approximation assumes that vertically adjacent laser beams 510, 520, 530, and 550 are parallel. Developers of the present technology have realized that such an assumption is admissible for calibration parameters being near null values, such as $\phi \approx 0.08°$ and $\theta \approx 0.26°$.

It should be noted that a diagonal vector $p_{k,l}$ between the first data point 512 ($p_k$) and a given neighbour $p_l$ on the plane 502 is defined as follows:

$$p_{k,l} = [\phi \cdot u \pm \theta_{j \pm 1, j} \cdot v] \cdot \|p_k\| \quad (10)$$

where u and v are unitary vectors, and where u is aligned on the plane 502 with the direction of azimuthal rotation of the LIDAR system, and where v perpendicular to u and is aligned on the plane 502 with the vertical direction. In other words, u and v define absciss and ordinate axes of $p_{k,l}$ coordinate frame. Additional information regarding how the electronic device 210 may be configured to determine u and v vectors is described in greater detail in the APPENDICES A and B.

For example, the electronic device 210 may be configured to determine by using the Equation 10, (i) for the neighbour data point 522 ($p_{l=0}$) a respective diagonal vector 540 ($p_{k,l=0}$), for the neighbour data point 522 ($p_{l=3}$) a respective diagonal vector 541 ($p_{k,l=3}$), and so on. It should be noted that diagonal vectors ($p_{k,l=1}$ and $p_{k,l=2}$) for the neighbour data point 532 ($p_{l=1}$) and for the neighbour data point 542 ($p_{l=2}$), respectively, are not depicted in FIG. 5 for clarity of illustration only.

Once the diagonal vector $p_{k,l}$ for a given neighbour data point $p_l$ is determined by the electronic device 210, the electronic device 210 may determine a neighbour beam distance $d_{k,l}$ between (i) the first data point 512 $p_k$ and a (ii) respective neighbour data point $p_l$ via the following:

$$d_{k,l} = \frac{\|p_{k,l}\|^2}{\sqrt{\|p_{k,l}\|^2 - \|\langle p_{k,l}, n_p \rangle\|^2}} \quad (12)$$

where $d_{k,l}$ is a projection of a respective diagonal vector $p_{k,l}$ onto a reflecting surface 504 and which is orthogonal to normal $n_k$ along the laser beam flight direction. It should be noted that the electronic device 210 may be configured to use information regarding the normal vector associated with the first data point 512 $p_k$ and/or a given normal vector associated with any one of the neighbour data points as the normal $n_k$ in the Equation (12).

Put another way, the electronic device 210 may be configured to determine via the Equation (12), the number of neighbour beam distances for the first data point 512 $p_k$, which include: (i) a neighbour beam distance 528 $d_{k,l=0}$ for the neighbour data point 522 $p_{l=0}$, (i) a neighbour beam distance 558 $d_{k,l=3}$ for the neighbour data point 522 $p_{l=3}$, and so on. It should be noted that neighbour beam distances $d_{k,l=1}$ and $d_{k,l=2}$ are not depicted in FIG. 5 for clarity of illustration only.

The electronic device 210 may then be configured to identify the largest one amongst the four neighbour beam distances $d_{k,l=0}$, $d_{k,l=1}$, $d_{k,l=2}$, and $d_{k,l=3}$ as $\max_{l \in \{0 \ldots 3\}} d(p_k, p_l)$ from the Equation (9). In other words, the electronic device 210 may be configured to identify the largest one of the four neighbour beam distances $d_{k,l=0}$, $d_{k,l=1}$, $d_{k,l=2}$, and $d_{k,l=3}$ as the geometry-based threshold for the first data point 512 $p_k$.

Then, the electronic device 210 may employ the Equation (9) for determining whether the point-to-point distance between the first data point 512 $p_k$ and the given second data point $p'_k$ is above or below the geometrically-based threshold for the first data point 512 $p_k$.

It should be noted that at least some aspects of the present technology are discussed in greater detail in APPENDICES A and B of the present specification.

Rejecting Pairs of Data Points by Using the GCR

To better illustrate this, let it be assumed that $\|m_k\|$ (the point-to-point distance between the given initial pair of data points) is below the geometrically-based threshold for the first data point 512 $p_k$ (the largest one of the four neighbour beam distances $d_{k,l=0}$, $d_{k,l=1}$, $d_{k,l=2}$, and $d_{k,l=3}$). In such a case, the electronic device 210 may be configured to keep the given initial pair of data points for further processing.

Now let it be assumed that $\|m_k\|$ (the point-to-point distance between the given initial pair of data points) is above the geometry-based threshold for the first data point 512 $p_k$ (the largest one of the four neighbour beam distances $d_{k,l=0}$, $d_{k,l=1}$, $d_{k,l=2}$, and $d_{k,l=3}$). In such a case, the electronic device 210 may determine that the point-to-point distance between the given initial pair of data points is to long, and hence, the electronic device 210 may be configured to exclude the given initial pair of data points from further processing.

Figure 6:
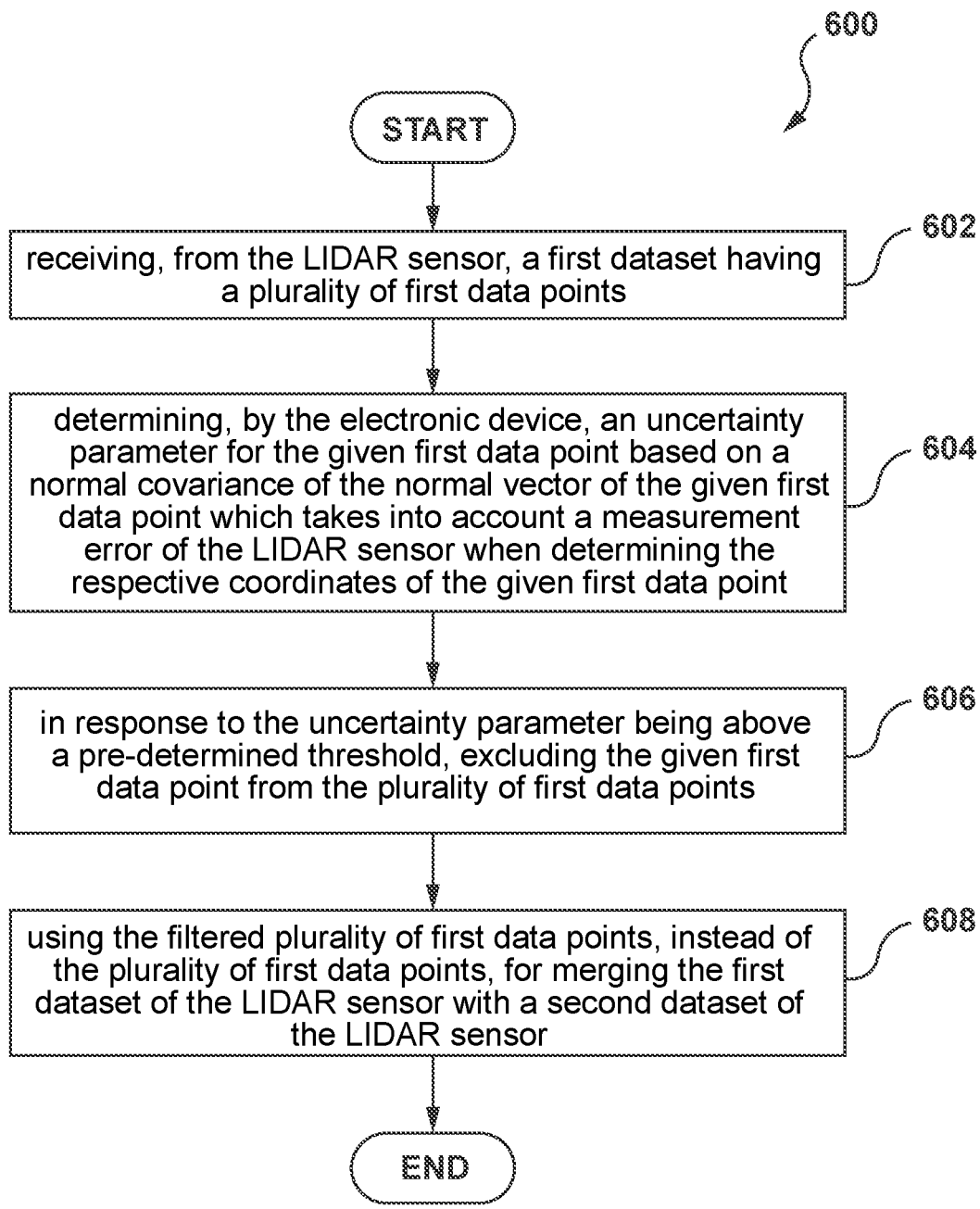
FIG. 6 is a schematic block diagram of a flow chart of a method of processing LIDAR sensor data in accordance with non-limiting embodiments of the present technology.
Figure 7:
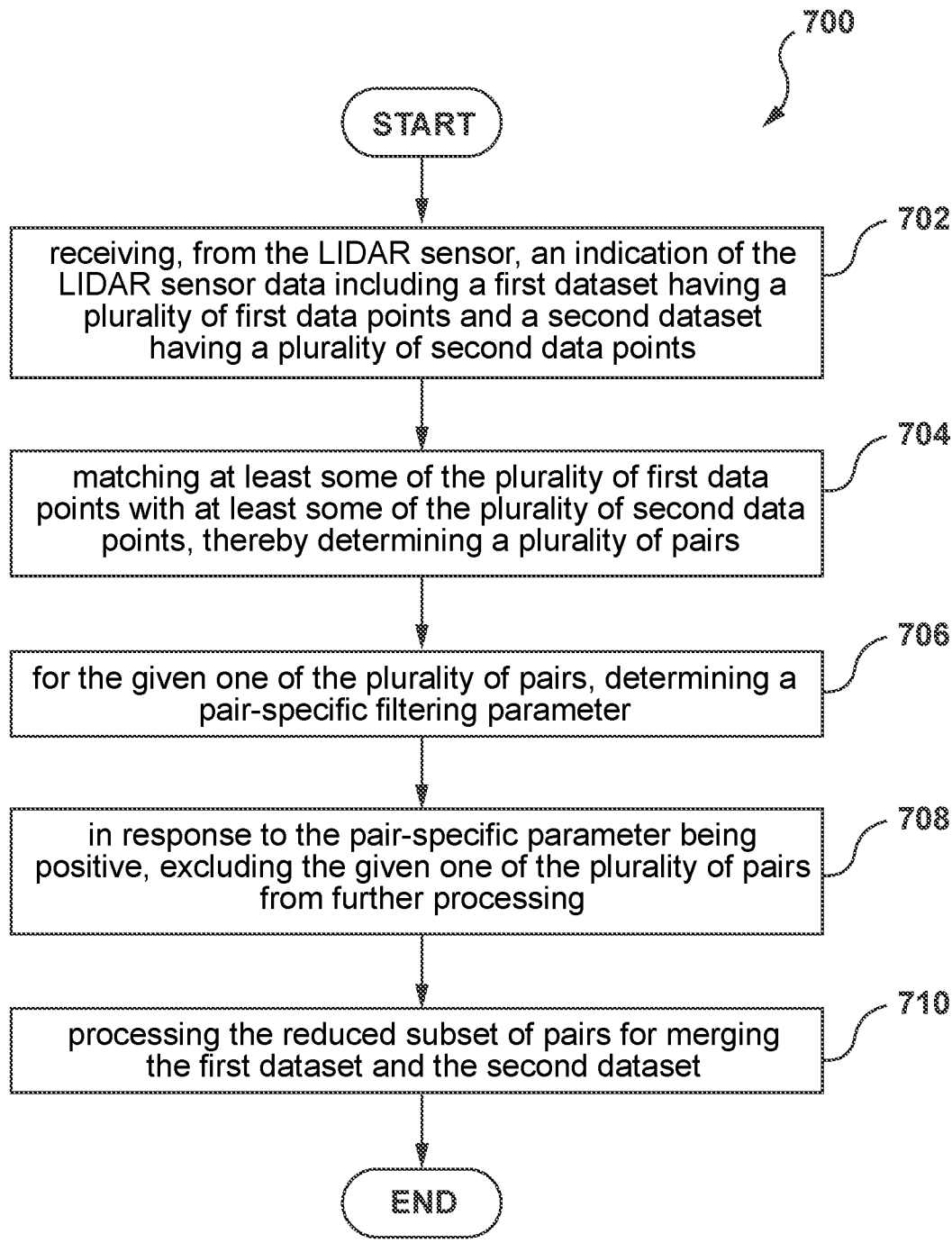
FIG. 7 is a schematic block diagram of a flow chart of an other method of processing LIDAR sensor data in accordance with non-limiting embodiments of the present technology.

In some embodiments of the present technology, the electronic device 210 may be configured to execute a method 600 of processing LIDAR sensor data, as depicted in FIG. 6. In other embodiments, the electronic device 210 may be configured to execute a method 700 of processing LIDAR sensor data, as depicted in FIG. 7. How the electronic device 210 may be configured to execute the methods 600 and the methods 700 will now be discussed in turn.

STEP 602: Receiving, from the LIDAR Sensor, a First Dataset Having a Plurality of First Data Points The method 600 begins at step 602 with the electronic device 210 configured to receive the first dataset from the LIDAR sensor which has a plurality of first data points. For example, the first dataset may include the first captured 3D point cloud, as mentioned above. It should be noted that this first dataset is captured by the LIDAR sensor and which may be biased by the measurement error of the LIDAR sensor itself.

It should also be noted that a given first data point from the plurality of first data point is representative of respective spatial coordinates in a 3D space. The given first data point is also associated with a respective normal vector from a plurality of normal vectors. For example, a respective one of the plurality of first data points may be associated with a respective one of the plurality of normal vectors.

It is contemplated that the LIDAR sensor may be mounted to a Self-Driving Car (SDC), such as for example, the vehicle 220 depicted in FIG. 2.

STEP 604: Determining, by the Electronic Device, an Uncertainty Parameter for the Given First Data Point Based on a Normal Covariance of the Normal Vector of the Given First Data Point which Takes into Account a Measurement Error of the LIDAR Sensor when Determining the Respective Coordinates of the Given First Data Point The method 600 continues to step 604 with the electronic device 210 being configured to determine an uncertainty parameter for the given first data point based on a normal covariance of the normal vector of the given first data point, which normal covariance takes into account a measurement error of the LIDAR sensor when determining the respective spatial coordinates of the given first data point.

It is contemplated that the uncertainty parameter for given first data point may correspond to the value $C_{2,2}$ for the given first data point and may be obtained via the Equation (5) above.

It should be noted that, in order to determine the value $C_{2,2}$, the electronic device 210 may be configured to estimate $Cov[V_2]$ (e.g., covariance of the normal vector 406) by propagation of the uncertainty technique summarized in the Equations (3) and (4). It should be noted that the estimation of $Cov[V_2]$ depends on the measurement error of the LIDAR system during determination of spatial coordinates of captured data points (see the Equation (4)). Once the electronic device 210 estimates the $Cov[V_2]$, the electronic device 210 may be configured to align it with the normal vector $V_2$—that is, the electronic device 210 is configured to perform the alignment step for $Cov[V_2]$ as defined in the Equation (5). The result of the alignment step performed by the electronic device 210 yields the matrix C which is the covariance of $V_2$ in a normal-aligned coordinate system (e.g., coordinate system defined by $V_0$, $V_1$, and $V_2$). The electronic device 210 may then be configured to identify the value $C_{2,2}$ from the matrix C as the uncertainty parameter for the given first data point.

In some embodiments, the electronic device 210 may be configured to determine the normal covariance of the normal vector of the given first data point while taking into account an uncertainty in the respective coordinates of the given first data point. It is contemplated that the uncertainty may be approximated as a Gaussian random variable. It is further contemplated that the measurement error of the LIDAR sensor may be approximated by a sphere with a standard deviation (see Equation the (4)).

STEP 606: In Response to the Uncertainty Parameter being Above a Pre-Determined Threshold, Excluding the Given First Data Point from the Plurality of First Data Points The method 600 continues to step 606 with the electronic device 210 configured to, in response to the uncertainty parameter for the given first data point being above a pre-determined threshold, exclude the given first data point from the plurality of first data points.

For example, the pre-determined threshold may correspond to the threshold value $c_T$ from the Equation (7). It should be noted that if the uncertainty parameter (e.g., $C_{2,2}$) for the given first data point is above the threshold value $c_T$, the electronic device 210 may be configured to exclude the given first data point from further processing during the ICP algorithm.

Therefore, by performing the step 608, the electronic device 210 may be configured to determine a filtered plurality of first data points based on the first plurality of data points. It can also be said that the electronic device 210 is thus configured to determine the first filtered 3D point cloud based on the first captured 3D point cloud.

STEP 608: Using the Filtered Plurality of First Data Points, Instead of the Plurality of First Data Points, for Merging the First Dataset of the LIDAR Sensor with a Second Dataset of the LIDAR Sensor The method 600 continues to step 608 with the electronic device 210 being configured to use the filtered plurality of first data points (determined during the step 606), instead of the plurality of first data points (received during the step 602), for merging the first dataset of the LIDAR sensor with a second dataset of the LIDAR sensor.

In some embodiments, it is contemplated that the electronic device 210 may be configured to use the filtered plurality of first data points, instead of the plurality of first data points, during the matching step of the ICP algorithm.

For example, the electronic device may be configured to estimate a transformation rule between the first dataset and the second dataset during the ICP algorithm based on the first filtered plurality of first data points. It is contemplated that the transformation rule may be an output of the ICP algorithm.

In addition, in some embodiments of the present technology, the electronic device 210 may also use the merged first and second datasets for controlling operation of the SDC.

As mentioned above, the electronic device 210 may be configured to execute the method 700 that will now be described in greater details.

STEP 702: Receiving, from the LIDAR Sensor, an Indication of the LIDAR Sensor Data Including a First Dataset Having a Plurality of First Data Points and a Second Dataset Having a Plurality of Second Data Points The method 700 begins at step 702 with the electronic device 210 configured to receive, from the LIDAR sensor, an indication of the LIDAR sensor data including a first dataset having a plurality of first data points and a second dataset having a plurality of second data points.

It should be noted that each one from the plurality of first data points and each one from the plurality of second data points is representative of respective spatial coordinates in a 3D space and is associated with a respective normal vector from a plurality of normal vectors.

It should be noted that the first dataset and the second dataset (e.g., including a first 3D point cloud and a second 3D point cloud) may have been captured during sequential scanning phases of the LIDAR sensor.

STEP 704: Matching at Least Some of the Plurality of First Data Points with at Least Some of the Plurality of Second Data Points, Thereby Determining a Plurality of Pairs The method 700 continues to step 704 with the electronic device 210 configured to match at least some of the plurality of first data points with at least some of the plurality of second data points, thereby determining a plurality of pairs.

For example, by performing this matching, the electronic device 210 may be configured to determine the plurality of initial pairs, as mentioned above. This means that the electronic device 210 may be configured to determine $\tilde{M}$ as defined in the Equation (7), where $\tilde{M}$ is the plurality of initial pairs (prior to rejection of at least some initial pairs).

It should be noted that a given one of the plurality of these initial pairs includes (i) a given first data point and (ii) a given second data point, and where the given first data point and the given second data points are separated by a point-to-point actual distance. For example, a given one of the plurality of these initial pairs may be defined as $\dot{m}_k$ that represents a given initial pair from the plurality of initial pairs. The given initial pair $\dot{m}_k$ includes (i) the given one of the first plurality of data points $p_k$ from the first 3D point cloud, and (ii) the corresponding one of the plurality of second data points $p'_k$ from second 3D point cloud. In this example, the point-to-point actual distance between $p_k$ and $p'_k$ may be defined as the Euclidean distance therebetween (see the Equation (8)). Hence, it is contemplated that the point-to-point actual distance may be a Euclidean distance between the respective initial pair of data points in the 3D space.

It should be noted that the electronic device 210 may be configured to perform such matching in a variety of ways. For example, the electronic device 210 may be configured to perform the matching in a different manner for a given application.

STEP 706: For the Given One of the Plurality of Pairs, Determining a Pair-Specific Filtering Parameter The method 700 continues to step 706 with the electronic device 210 configured to determining a pair-specific filtering parameter for the given one of the plurality of (initial) pairs that is determined during the step 704.

For example, the electronic device 210 may be configured to determine the pair-specific filtering parameter to be positive for a given initial pair of data points if the point-to-point distance (e.g., the Euclidean distance between the initial pair of data points) is above the geometry-based threshold for the given initial pair of data points.

It is contemplated that the electronic device 210 may be configured to determine the pair-specific filtering parameter by defining/identifying for the given second data point in the given initial pair, a set of neighbouring data points (e.g., see first data points 522, 532, 542, and 552 in FIG. 5). For example, this set of neighbouring points is associated with a subset of lasers of the plurality of lasers vertically adjacent to a given laser that has been instrumental in generating the given first data point from the given initial pair. As explained above, this subset of lasers has been instrumental in generating the set of neighbouring data points.

In at least some embodiments of the present technology, the set of neighbouring data points may comprise four neighbouring data points. For example, as depicted in FIG. 5, the four neighbouring data point may comprise two data points vertically above the given first data point and two data points vertically below the given first data point (e.g., located on an upper ring and on a lower ring from a ring of the given second data point, respectively).

In some embodiments, it is contemplated that the given first data point and the set of neighbouring points define a segment of a unit sphere. It is also contemplated that the approximation plane generated by the electronic device 210 may be based on an assumption that laser beams generated by the plurality of lasers are parallel.

As explained above, it can be said that the first data point 512 ($p_k$) and the neighbouring data points 522, 532, 542, and 552 ($p_l$ where l∈{0 . . . 3}) may be represented on a segment of the unit-sphere. Put another way, the first data point 512 ($p_k$) and the neighbouring data points 522, 532, 542, and 552 define a segment of the unit-sphere. This segment could be approximated by a plane 502 in FIG. 5, in turn assuming neighbor beams parallel It should be noted that such approximation assumes that vertically adjacent laser beams 510, 520, 530, and 550 are parallel. Developers of the present technology have realized that such an assumption is admissible for calibration parameters being near null values, such as ϕ≈0.08° and θ≈0 0.26°.

It is contemplated that the electronic device 210 may be configured to calculate the neighbour beam distances between the given first data point 512 and respective ones the set of neighbouring points 522, 532, 542, and 552. A given neighbour beam distance $d_{k,l}$ is representative of a linear distance between the given first data point 512 and a respective one of the set of neighbouring points ($p_l$).

It is contemplated that, in order to calculate the calculating the neighbour beam distances, the electronic device 210 may be configured to generate (i) a given diagonal vector $p_{k,l}$ between the given first data point 512 $p_k$ and a respective one of the set of neighbouring points in a first coordinate system (unitary vectors u and v), and (ii) calculate the respective neighbour beam distance $d_{k,l}$ by projecting the given diagonal vector $p_{k,l}$ onto the reflecting surface 504 orthogonal to a laser path direction.

For example, the electronic device 210 may be configured to calculate the neighbour beam distances $d_{k,l=0}$, $d_{k,l=1}$, $d_{k,l=2}$, and $d_{k,l=3}$ via the Equation (12).

It is further contemplated that the electronic device 210 may calculate the neighbour beam distances between the given first data point 512 and the set of neighbouring points based on an angular increment of azimuthal rotation and angular distances in pitch between vertically spaced lasers (e.g., $\phi$ and $\theta$).

Then, it is contemplated that the electronic device 210 may be configured to identify a largest neighbour beam distance amongst all the neighbourhood beam distances (in this case, amongst ($d_{k,l=0}$, $d_{k,l=1}$, $d_{k,l=2}$, and $d_{k,l=3}$). Then, it is contemplated that the electronic device 210 may be configured to determine, in response to the point-to-point actual distance being above the largest neighbour beam distance, that the pair-specific filtering parameter is to be positive.

STEP 708: In Response to the Pair-Specific Parameter being Positive, Excluding the Given One of the Plurality of Pairs from Further Processing The method 700 continues to step 708 with the electronic device 210 configured to discard/exclude the given one of the plurality of (initial) pairs (in the examples above the initial pair including $p_k$ and $p'_k$) from further processing. The electronic device 210 is thereby configured to define a reduced plurality of pairs (e.g., excluding at least the initial pair $p_k$ and $p'_k$)

STEP 710: Processing the Reduced Subset of Pairs for Merging the First Dataset and the Second Dataset The method 700 continues to step 710 with the electronic device 210 configured to process the reduced plurality of pairs for merging the first dataset and the second dataset.

In some embodiments, the electronic device 210 may be configured to (as part of the processing of the reduced plurality of pairs) estimate a transformation rule between the first dataset and the second dataset. For example, the transformation rule may be output of an ICP algorithm performed by the electronic device.

In addition, the electronic device 210 may be configured to use the merged first and second datasets for controlling operation of the vehicle 220.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of processing LIDAR sensor data, the method executable by an electronic device operatively coupled to a LIDAR sensor, the method comprising:
   receiving, by the electronic device from the LIDAR sensor, a first 3D point cloud comprising a plurality of first data points,
      a given first data point from the plurality of first data points being (i) representative of respective coordinates in a 3D space and (ii) associated with a respective normal vector from a plurality of normal vectors;
   determining, by the electronic device, an uncertainty parameter for the given first data point based on:
      a normal covariance of the normal vector of the given first data point,
         wherein the normal covariance is calculated based on a measurement error of the LIDAR sensor when determining the respective coordinates of the given first data point, the measurement error of the LIDAR sensor affecting calculation of the normal vector;
   in response to the uncertainty parameter being above a pre-determined threshold, removing, by the electronic device, the given first data point from the first 3D point cloud,
      wherein the first 3D point cloud comprises a filtered plurality of first data points after removing the given first data point;
   after removing the given first data point from the first 3D point cloud, using, by the electronic device, the filtered plurality of first data points for merging the first 3D point cloud of the LIDAR sensor with a second 3D point cloud of the LIDAR sensor, thereby generating a merged 3D point cloud; and
   using, by the electronic device, the merged 3D point cloud for controlling operation of a Self-Driving Car (SDC).

2. The method of claim 1, wherein the method further comprises:
   receiving, by the electronic device from the LIDAR sensor, the second 3D point cloud having a plurality of second data points,
      a given second data point from the plurality of second data points being (i) representative of respective coordinates in a 3D space and (ii) associated with a respective normal vector from an other plurality of normal vectors;
   determining, by the electronic device, an other uncertainty parameter for the given second data point based on:
      a normal covariance of the normal vector of the given second data point,
         the normal covariance taking into account the measurement error of the LIDAR sensor when determining the respective coordinates of the given second data point, the measurement error of the LIDAR sensor affecting calculation of the normal vector of the given second data point;
   in response to the other uncertainty parameter being above a pre-determined threshold, removing, by the electronic device, the given second data point from the second 3D point cloud,
      thereby determining a filtered plurality of second data points; and
   using, by the electronic device, the filtered plurality of second data points, for merging the first 3D point cloud of the LIDAR sensor with the second 3D point cloud of the LIDAR sensor.

3. The method of claim 1, wherein the method further comprises:
   determining, by the electronic device, the normal covariance of the normal vector of the given first data point while taking into account an uncertainty in the respective coordinates of the given first data point.

4. The method of claim 3, wherein the uncertainty is approximated as a Gaussian random variable.

5. The method of claim 1, wherein the measurement error of the LIDAR sensor is approximated by a sphere with a standard deviation.

6. The method of claim 1, wherein the using the filtered plurality of first data points comprises using, by the electronic device, the filtered plurality of first data points instead of the plurality of first data points during a matching step of an ICP algorithm.

7. The method of claim 6, wherein the using the filtered plurality of first data points comprises:

estimating, by the electronic device, a transformation rule between the first 3D point cloud and the second 3D point cloud.

8. The method of claim 7, wherein the transformation rule is an output of the ICP algorithm.

9. The method of claim 1, wherein the LIDAR sensor is mounted onto the Self-Driving Car (SDC).

10. An electronic device for processing LIDAR sensor data, the electronic device operatively coupled to a LIDAR sensor, the electronic device being configured to:
receive, from the LIDAR sensor, a first 3D point cloud comprising a plurality of first data points,
a given first data point from the plurality of first data points being (i) representative of respective coordinates in a 3D space and (ii) associated with a respective normal vector from a plurality of normal vectors;
determine, by the electronic device, an uncertainty parameter for the given first data point based on:
a normal covariance of the normal vector of the given first data point,
wherein the normal covariance is calculated based on a measurement error of the LIDAR sensor when determining the respective coordinates of the given first data point, the measurement error of the LIDAR sensor affecting calculation of the normal vector;
in response to the uncertainty parameter being above a pre-determined threshold, removing the given first data point from the first 3D point cloud,
wherein the first 3D point cloud comprises a filtered plurality of first data points after removing the given first data point;
after removing the given first data point from the 3D point cloud, use the filtered plurality of first data points for merging the first 3D point cloud of the LIDAR sensor with a second 3D point cloud of the LIDAR sensor, thereby generating a merged 3D point cloud; and
use the merged 3D point cloud for controlling operation of a Self-Driving Car (SDC).

11. The electronic device of claim 10, wherein the electronic device is further configured to:
receive, from the LIDAR sensor, the second 3D point cloud having a plurality of second data points,
a given second data point from the plurality of second data points being (i) representative of respective coordinates in a 3D space and (ii) associated with a respective normal vector from an other plurality of normal vectors,
determine, by the electronic device, an other uncertainty parameter for the given second data point based on:
a normal covariance of the normal vector of the given second data point,
the normal covariance taking into account the measurement error of the LIDAR sensor when determining the respective coordinates of the given second data point, the measurement error of the LIDAR sensor affecting calculation of the normal vector of the given second data point;
in response to the other uncertainty parameter being above a pre-determined threshold, remove the given second data point from the second 3D point cloud, thereby determining a filtered plurality of second data points; and
use the filtered plurality of second data points for merging the first 3D point cloud of the LIDAR sensor with the second 3D point cloud of the LIDAR sensor.

12. The electronic device of claim 10, wherein the electronic device is further configured to:
determine the normal covariance of the normal vector of the given first data point while taking into account an uncertainty in the respective coordinates of the given first data point.

13. The electronic device of claim 12, wherein the uncertainty is approximated as a Gaussian random variable.

14. The electronic device of claim 10, wherein the measurement error of the LIDAR sensor is approximated by a sphere with a standard deviation.

15. The electronic device of claim 10, wherein the electronic device is configured to use the filtered plurality of first data points instead of the plurality of first data points during a matching step of an ICP algorithm.

16. The electronic device of claim 15, wherein the electronic device is configured to estimate a transformation rule between the first 3D point cloud and the second 3D point cloud.

17. The electronic device of claim 16, wherein the transformation rule is an output of the ICP algorithm.

18. The electronic device of claim 10, wherein the LIDAR sensor is mounted onto the Self-Driving Car (SDC).

* * * * *